(12) United States Patent
Niwa

(10) Patent No.: US 11,342,581 B2
(45) Date of Patent: May 24, 2022

(54) CERAMIC POWDER MATERIAL, METHOD FOR PRODUCING CERAMIC POWDER MATERIAL, AND BATTERY

(71) Applicant: DAIICHI KIGENSO KAGAKU KOGYO CO., LTD., Osaka (JP)

(72) Inventor: Tadahiro Niwa, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 0 days.

(21) Appl. No.: 17/268,083

(22) PCT Filed: Jul. 1, 2020

(86) PCT No.: PCT/JP2020/025760
§ 371 (c)(1),
(2) Date: Feb. 11, 2021

(87) PCT Pub. No.: WO2021/014905
PCT Pub. Date: Jan. 28, 2021

(65) Prior Publication Data
US 2021/0249686 A1 Aug. 12, 2021

(30) Foreign Application Priority Data
Jul. 19, 2019 (JP) .............................. JP2019-133591

(51) Int. Cl.
*H01M 10/0562* (2010.01)
*C01G 25/00* (2006.01)
(Continued)

(52) U.S. Cl.
CPC ...... *H01M 10/0562* (2013.01); *C01G 25/006* (2013.01); *H01M 10/0525* (2013.01);
(Continued)

(58) Field of Classification Search
None
See application file for complete search history.

(56) References Cited

U.S. PATENT DOCUMENTS

2010/0047696 A1 2/2010 Yoshida et al.
2011/0053002 A1 3/2011 Yamamura et al.
(Continued)

FOREIGN PATENT DOCUMENTS

CN 102010183 A 4/2011
CN 108155413 A 6/2018
(Continued)

OTHER PUBLICATIONS

International Search Report issued in PCT/JP2020/025760; dated Sep. 15, 2020.
(Continued)

*Primary Examiner* — Daniel S Gatewood
(74) *Attorney, Agent, or Firm* — Studebaker & Brackett PC

(57) ABSTRACT

A ceramic powder material which contains an LLZ-based garnet-type compound represented by $Li_{7-3x}Al_xLa_3Zr_2O_{12}$ (where x satisfies $0 \leq x \leq 0.3$) and in which a main phase of a crystal phase undergoes phase transition from a tetragonal phase to a cubic phase in the process of raising a temperature from 25° C. to 1050° C. and the main phase is the cubic phase even after the temperature is lowered to 25° C.

9 Claims, 6 Drawing Sheets

(51) Int. Cl.
*H01M 10/0525* (2010.01)
*H01B 1/08* (2006.01)

(52) U.S. Cl.
CPC ...... *C01P 2002/30* (2013.01); *C01P 2002/52* (2013.01); *C01P 2002/72* (2013.01); *C01P 2002/76* (2013.01); *C01P 2004/03* (2013.01); *C01P 2006/10* (2013.01); *C01P 2006/36* (2013.01); *C01P 2006/40* (2013.01); *H01B 1/08* (2013.01); *H01M 2300/0071* (2013.01)

(56) References Cited

U.S. PATENT DOCUMENTS

| | | |
|---|---|---|
| 2016/0049688 A1 | 2/2016 | Sung et al. |
| 2016/0329598 A1 | 11/2016 | Schneider et al. |
| 2016/0380304 A1* | 12/2016 | Kim ................. C04B 35/50 429/189 |
| 2017/0047589 A1 | 2/2017 | Noi et al. |
| 2018/0375149 A1* | 12/2018 | Beck ................. H01M 10/052 |
| 2019/0084887 A1 | 3/2019 | Yamamoto et al. |

FOREIGN PATENT DOCUMENTS

| | | |
|---|---|---|
| CN | 109301315 A | 2/2019 |
| EP | 3 778 488 A1 | 2/2021 |
| GN | 109742442 A | 5/2019 |
| JP | 2011051800 A | 3/2011 |
| JP | 2011-195373 A | 10/2011 |
| JP | 2013032259 A | 2/2013 |
| JP | 2017511781 A | 4/2017 |
| JP | 2017081794 A | 5/2017 |
| JP | 2017168396 A | 9/2017 |
| JP | 2018065704 A | 4/2018 |
| JP | 2018065704 A * | 4/2018 |
| KR | 10-2016-0135367 A | 11/2016 |
| WO | 2015163152 A1 | 10/2015 |
| WO | 2016/061015 A1 | 4/2016 |
| WO | WO-2016061015 A1 * | 4/2016 ............ C04B 35/48 |
| WO | 2018013517 A1 | 1/2018 |

OTHER PUBLICATIONS

Written Opinion issued in PCT/JP2020/025760; dated Sep. 15, 2020.
Y. Matsuda et al., "Phase formation of a garnet-type lithium-ion conductor Li7—3xAlxLa3Zr2O12", Solid State Ionics, Sep. 2015, vol. 277, pp. 23-29, Elsevier.
An Office Action mailed by the Korean Intellectual Property Office dated Jun. 22, 2021, which corresponds to Korean Patent Application No. 10-2021-7004748 and is related to U.S. Appl. No. 17/268,083 with English anguage translation.
An Office Action mailed by China National Intellectual Property Administration dated Jun. 23, 2021, which corresponds to Chinese Patent Application No. 202080004690.1 and is related to U.S. Appl. No. 17/268,083 with English language translation.
Ying Jin et al., "Al-doped Li7La3Zr2O12 synthesized by a polymerized complex method", Journal of Power Sources, vol. 196, No. 20, Oct. 1, 2011, pp. 8683-8687, ISSN: 0378-7753.
The extended European search report issued by the European Patent Office dated Oct. 15, 2021, which corresponds to European Patent Application No. 20843070.2-1108 and is related to U.S. Appl. No. 17/268,083.
An Office Action mailed by China National Intellectual Property Administration dated Oct. 20, 2021, which corresponds o Chinese Patent Application No. 202080004690.1 and is related to U.S. Appl. No. 17/268,083; with English language translation.
An Office Action mailed by China National Intellectual Property Administration dated Jan. 19, 2022, which corresponds to Chinese Patent Application No. 202080004690.1 and is related to U.S. Appl. No. 17/268,083; with English language translation.

* cited by examiner

CERAMIC POWDER MATERIAL, METHOD FOR PRODUCING CERAMIC POWDER MATERIAL, AND BATTERY

TECHNICAL FIELD

The present invention relates to a ceramic powder material, a method for producing a ceramic powder material, and a battery.

BACKGROUND ART

Garnet is a cubic silicate mineral represented by a chemical composition $M^2{}_{+3}M^3{}_{+2}Si_3O_{12}$ ($M^{2+}$=Mg, Ca, Mn, or Fe, $M^{3+}$=Al, Cr, or Fe). Garnet-type compounds having a crystal structure similar to that of garnet are not limited to silicates, and all positions of $M^{2+}$, $M^{3+}$, and $Si^{4+}$ ions in the crystal structure can be replaced with ions of various valences. Hence, there are a wide variety of garnet-type compounds having a crystal structure similar to that of garnet. There are substances that are widely utilized in industry among chemically synthesized garnet-type compounds.

In recent years, among garnet-type compounds, $Li_7La_3Zr_2O_{12}$ (hereinafter, also referred to as "LLZ") and LLZ analogs in which various additive elements are introduced into LLZ are regarded as promising solid electrolyte materials for all-solid-state lithium-ion secondary batteries since these have a high lithium-ion conductance and exhibit high electrochemical stability with respect to lithium metal. All-solid-state lithium-ion secondary batteries are a next-generation secondary battery exhibiting ultimate safety since nonflammable solid electrolyte materials are used therein, and research and development of materials and devices are being actively carried out for practical application thereof (see, for example, Patent Documents 1 to 3). Hereinafter, LLZ and LLZ analogs are collectively referred to as "LLZ-based garnet-type compounds".

PRIOR ART DOCUMENTS

Patent Documents

Patent Document 1: JP-A-2013-32259
Patent Document 2: JP-A-2017-168396
Patent Document 3: JP-A-2017-511781

SUMMARY OF THE INVENTION

Problems to be Solved by the Invention

LLZ-based garnet-type compounds are usually powders, and it is said that LLZ-based garnet-type compounds are required to be formed into a dense molded body and sintered at 1200° C. or more in order to be used as a solid electrolyte.

However, LLZ-based garnet-type compounds undergo a decomposition reaction involving melting and volatilization of Li that is the main component under high temperature conditions exceeding 1100° C. in an air atmosphere, and there is a problem that deformation and fracture of the sintered body are caused.

As an inexpensive manufacturing method of all-solid-state batteries using oxides, a method (integral sintering) in which cells are formed by co-sintering the respective members has been studied, but it is required to perform the heat treatment in a temperature region in which the reaction between the electrolyte and the electrode active material does not occur when this process is conducted.

In Patent Documents 1 to 3, as a method for lowering the sintering temperature when forming a sintered body, it is considered that a low-melting-point compound (for example, lithium borate) is intended to coexist with an LLZ-based garnet-type compound (in particular, see paragraph[0108] of Patent Document 2).

In Patent Documents 1 to 3, it is considered that the sintering temperature can be lowered by melting a low-melting-point compound to form a liquid phase and covering the surface of the LLZ-based garnet-type compound (powder) with this liquid phase. In the present specification, a low-melting-point compound refers to a compound having a melting point of 1000° C. or less.

However, in such a method, since a large amount of liquid phase is contained, this liquid phase becomes resistance and may cause a decrease in ionic conductance.

The present invention has been made in view of the above-described problems, and an object thereof is to provide a ceramic powder material from which a sintered body that is dense and exhibits excellent lithium-ion conductivity can be obtained under a relatively low temperature condition. Another object of the present invention is to provide a method for producing the ceramic powder material. Another object of the present invention is to provide a battery including a sintered body obtained by sintering the ceramic powder material.

Means for Solving the Problems

The present inventors have carried out intensive research on ceramic powder materials. As a result, it has been surprisingly found out that a ceramic powder material in which the main phase of the crystal phase undergoes phase transition from a tetragonal phase to a cubic phase is sintered under a relatively low temperature condition when a heat treatment of a ceramic powder material is performed to obtain a sintered body. Moreover, it has been found out that it is possible to obtain a sintered body that is dense and exhibits excellent lithium-ion conductivity under a relatively low temperature condition when the ceramic powder material is used, and the present invention has been completed.

In other words, the ceramic powder material according to the present invention contains
an LLZ-based garnet-type compound represented by $Li_{7-3x}Al_xLa_3Zr_2O_{12}$ (where $0 \leq x \leq 0.3$), and a main phase of a crystal phase of the ceramic powder material undergoes phase transition from a tetragonal phase to a cubic phase in process of raising a temperature from 25° C. to 1050° C. and the main phase is the cubic phase even after the temperature is lowered to 25° C.

According to the configuration, it is possible to obtain a sintered body at least at a relatively low temperature of 1050° C. since the main phase of the crystal phase undergoes phase transition from a tetragonal phase to a cubic phase in the process of raising the temperature from 25° C. to 1050° C.

The present inventors presume that the phenomenon that the main phase of the crystal phase undergoes phase transition from a tetragonal phase to a cubic phase occurs since lithium (hereinafter, also referred to as "Li") is eliminated from the LLZ-based garnet-type compound by temperature rise.

The present inventors presume the reason why sintering occurs when the main phase of the crystal phase undergoes phase transition from a tetragonal phase to a cubic phase is that a liquid phase of salts of eliminated Li is uniformly formed on the surface of the LLZ-based garnet-type compound and the existence of this liquid phase further lowers the sintering temperature.

The sintered body obtained under a relatively low temperature condition of 1050° C. becomes a dense molded body since the progress of the decomposition reaction involving melting and volatilization of Li that is the main component is suppressed. The sintered body obtained becomes a sintered body exhibiting excellent lithium-ion conductivity since sintering occurs even under a relatively low temperature condition of 1050° C.

According to the configuration, it is possible to obtain a sintered body that is dense and exhibits excellent lithium-ion conductivity under a relatively low temperature condition when the ceramic powder material is used since the main phase of the crystal phase undergoes phase transition from a tetragonal phase to a cubic phase in the process of raising the temperature from 25° C. to 1050° C. in this manner.

The liquid phase is a liquid formed by salts of eliminated Li and is uniformly generated on the surface of the LLZ-based garnet-type compound, and thus the amount of the liquid phase can be minimized as compared with that by the methods of Patent Documents 1 to 3 in which a liquid phase is formed by addition of a low-melting-point compound.

Consequently, it is possible to suppress a decrease in ionic conductance that is caused since a large amount of liquid phase is contained and is assumed in Patent Documents 1 to 3.

According to the configuration, it is possible to maintain the ionic conductivity high since the main phase is a cubic phase even after the temperature is lowered to 25° C. after the main phase of the crystal phase has undergone phase transition from a tetragonal phase to a cubic phase in the process of raising the temperature from 25° C. to 1050° C. In other words, the ionic conductivity may decrease in a case in which the main phase returns to the tetragonal phase when the temperature is again lowered to 25° C. even if the main phase of the crystal phase has undergone phase transition from a tetragonal phase to a cubic phase in the process of raising the temperature from 25° C. to 1050° C., but it is possible to suppress such a decrease in ionic conductivity and maintain the ionic conductivity high in the present invention.

In the configuration, it is preferable that the number of La atoms with respect to two Zr atoms is more than 3 and 4 or less, and [X−(Y−3)] is 0.14 or more and 0.25 or less, where X is the number of Al atoms with respect to two Zr atoms and Y is the number of La atoms with respect to two Zr atoms.

First, "the number of La atoms with respect to two Zr atoms is more than 3 and 4 or less" will be described.

The ceramic powder material according to the present invention contains an LLZ-based garnet-type compound and may contain other components as an optional component.

In the LLZ-based garnet-type compound, namely, $Li_{7-3x}Al_xLa_3Zr_2O_{12}$, the number of lanthanum atoms with respect to two Zr atoms is 3, and thus the optional component does not exist or the optional component does not contain La atom even if the optional component exists in a case in which the number of La atoms with respect to two Zr atoms is 3. On the other hand, in a case in which the number of La atoms with respect to two Zr atoms is 4, the optional component contains one La atom with respect to two Zr atoms in the LLZ-based garnet-type compound since the number of La atoms with respect to two Zr atoms in the LLZ-based garnet-type compound is 3.

In other words, the optional component contains more than 0 and 1 or less La atom with respect to two Zr atoms when "the number of La atoms with respect to two Zr atoms is more than 3 and 4 or less".

Moreover, in a case in which "the number of La atoms with respect to two Zr atoms is more than 3", that is, the optional component contains more than 0 lanthanum atoms, it is possible to easily lower the sintering temperature when the ceramic powder material is sintered since the compound containing La atom acts as a sintering auxiliary.

On the other hand, La atom exhibits low ionic conductivity. Hence, when "the number of La atoms with respect to two Zr atoms is 4 or less", that is, the number of La atoms in the optional component is 1 or less, it is possible to keep the ionic conductivity of the sintered body obtained from the ceramic powder material high.

Next, "[X−(Y−3)] is 0.14 or more and 0.25 or less, where X is the number of Al atoms with respect to two Zr atoms and Y is the number of La atoms with respect to two Zr atoms" will be described.

First, the meaning of (Y−3) will be described. (Y−3) means the number of La atoms contained in the optional component (hereinafter, also referred to as "surplus La").

For example, when Y is 3, that is, when the number of La atoms is 3 with respect to two Zr atoms, (Y−3) is "0". This means that La atom does not exist in the optional component. In other words, this means that surplus La does not exist.

On the other hand, when Y is larger than 3, this means that La atoms exist in the optional component by the number (Y−3) with respect to two Zr atoms.

As described above, (Y−3) means the number of lanthanum atoms contained in the optional component per two Zr atoms.

Next, the meaning of [X−(Y−3)] will be described. [X−(Y−3)] actually means the number of aluminum atoms dissolved in the LLZ-based garnet-type compound.

In a case in which surplus La exists in the ceramic powder material, that is, the optional component contains La atom, the same number of Al atoms as that of La atoms are withdrawn from the LLZ-based garnet-type compound and lanthanum aluminate ($LaAlO_3$) and the like are formed as the optional component. Hence, Al atoms are dissolved in the LLZ-based garnet-type compound by the number [X−(Y−3)] obtained by subtracting (Y−3) that is the same number as that of surplus La from the number X of Al atoms existing in the entire ceramic powder material.

Moreover, in a case in which [X−(Y−3)] is 0.14 or more, that is, Al atoms are dissolved in the LLZ-based garnet-type compound by 0.14 or more, the LLZ-based garnet-type compound is likely to be stabilized in a cubic phase.

On the other hand, when the number of Al atoms in the LLZ-based garnet-type compound is too large, a tetragonal phase is not generated. In the present invention, it is assumed that the phase transition from a tetragonal phase to a cubic phase contributes to a decrease in the sintering temperature, and it is thus possible to easily generate a tetragonal phase state before or during the temperature raising step by setting [X−(Y−3)] to 0.25 or less.

When [X−(Y−3)] is set to 0.14 or more and 0.25 or less in this manner, it is possible to easily generate a tetragonal phase state before or during the temperature raising step and easily cause phase transition from a tetragonal phase to a cubic phase in the process of raising the temperature to 1050° C.

In the configuration, it is preferable that the LLZ-based garnet-type compound contains one or more elements selected from the group consisting of gallium, yttrium, cerium, calcium, barium, strontium, niobium, and tantalum.

When the LLZ-based garnet-type compound contains one or more elements selected from the group consisting of gallium, yttrium, cerium, calcium, barium, strontium, niobium, and tantalum, it is possible to adjust the characteristics of the ceramic powder material to the characteristics according to the required characteristics.

In the configuration, it is preferable that the ceramic powder material contains a La compound represented by $Li_xLa_{1+2x}Al_{1-x}O_{3+2x}$ (where x is 0 or 0.5).

When a La compound represented by $Li_xLa_{1+2x}Al_{1-x}O_{3+2x}$ (where x is 0 or 0.5) is contained, the main phase of the crystal phase of the ceramic powder material more easily undergoes phase transition from a tetragonal phase to a cubic phase in the process of raising the temperature from 25° C. to 1050° C.

With regard to the phase transition, there are a case in which (1) the main phase of the crystal phase of the ceramic powder material is a cubic phase before temperature rise and changes to a tetragonal phase in the process of raising the temperature from 25° C. and further to a cubic phase until the temperature reaches 1050° C. and a case in which (2) the main phase of the crystal phase of the ceramic powder material is a tetragonal phase at the time point at which the temperature is not raised and changes to a cubic phase while the temperature rises from 25° C. to 1050° C.

The phase transition in the cases of (1) and (2) will be described below.

In the case of (1), in the process of raising the temperature of the ceramic powder material from 25° C. to 1050° C., Al is first withdrawn from the LLZ-based garnet-type compound by the La compound and this induces dissolution of Li into the LLZ-based garnet-type compound. At this time, the crystal phase of the LLZ-based garnet-type compound changes from a cubic phase to a tetragonal phase.

When the LLZ-based garnet-type compound in which Li is dissolved is subjected to a heat treatment at a higher temperature, Al withdrawn into the La compound is dissolved again into the LLZ-based garnet-type compound. By this, Li is eliminated from the LLZ-based garnet-type compound and forms a liquid phase (Li salt) on the surface layer of the LLZ-based garnet-type compound. At this time, the crystal phase of the LLZ-based garnet-type compound changes from a tetragonal phase to a cubic phase.

As described above, (1) is a case in which the main phase of the crystal phase of the ceramic powder material is a cubic phase before temperature rise and changes to a tetragonal phase in the process of raising the temperature from 25° C. and further to a cubic phase until the temperature reaches 1050° C.

In the case of (2), in the calcination when the ceramic powder material is produced, Al is first withdrawn from the LLZ-based garnet-type compound by the La compound and this induces dissolution of Li into the LLZ-based garnet-type compound. At this time, the crystal phase of the LLZ-based garnet-type compound changes from a cubic phase to a tetragonal phase. In other words, in the case of (2), the main phase of the ceramic powder material is a tetragonal phase at the time point at which the production of the ceramic powder material is completed, that is, when the ceramic powder material is a product. When the temperature of the ceramic powder material as a product of which the main phase is a tetragonal phase is raised from 25° C. to 1050° C., Al withdrawn into the La compound in the calcination when the ceramic powder material is produced is dissolved again into the LLZ-based garnet-type compound. By this, Li is eliminated from the LLZ-based garnet-type compound and forms a liquid phase (Li salt) on the surface layer of the LLZ-based garnet-type compound. At this time, the crystal phase of the LLZ-based garnet-type compound changes from a tetragonal phase to a cubic phase.

As described above, (2) is a case in which the main phase of the crystal phase of the ceramic powder material is a tetragonal phase at the time point at which the temperature is not raised and changes to a cubic phase while the temperature rises from 25° C. to 1050° C.

A La compound is not a low-melting-point compound and has a melting point higher than at least 1200° C. The melting point of the La compound is usually about 1200° C. to 2400° C.

The phase transition in the cases of (1) and (2) has been described above.

In the configuration, it is preferable that the ceramic powder material is subjected to a heat treatment at 1050° C. to obtain a sintered body having a density of 4.6 g/cm$^3$ or more and 5.2 g/cm$^3$ or less.

According to the configuration, it is possible to easily obtain a sintered body having a density of 4.6 g/cm$^3$ or more by subjecting the ceramic powder material to a heat treatment at a relatively low temperature of 1050° C. since the main phase of the crystal phase undergoes phase transition from a tetragonal phase to a cubic phase in the process of raising the temperature from 25° C. to 1050° C.

In the configuration, it is preferable that the ceramic powder material is subjected to a heat treatment at 1050° C. to obtain a sintered body having a lithium-ion conductivity of $1\times10^{-5}$ S/cm or more and $1\times10^{-3}$ S/cm or less at a measurement temperature of 30° C.

According to the configuration, it is possible to easily obtain a sintered body having a lithium-ion conductivity of $1\times10^{-5}$ S/cm or more by subjecting the ceramic powder material to a heat treatment at a relatively low temperature of 1050° C. since the main phase of the crystal phase undergoes phase transition from a tetragonal phase to a cubic phase in the process of raising the temperature from 25° C. to 1050° C. A sintered body having a lithium-ion conductivity of $1\times10^{-5}$ S/cm or more can be suitably utilized in, for example, an all-solid-state lithium-ion secondary battery.

The method for producing a ceramic powder material according to the present invention is a method for producing the ceramic powder material and includes a first step of mixing a solution of a carbonic acid species, a compound containing La as a constituent element, and a compound containing Al as a constituent element to obtain a precipitate;

a second step of preparing a mixture of the precipitate, a solution containing a zirconium carbonate complex, and a compound containing Li as a constituent element; and a third step of calcining the mixture at a temperature of 500° C. or more and 900° C. or less to obtain a calcined product.

According to the configuration, in the first step, a precipitate (hereinafter, also referred to as "lanthanum carbonate compound") which is a carbonate of La and Al is first obtained.

Next, in the second step, a Zr component and a Li component can be uniformly supported on the surface of the precipitate (lanthanum carbonate compound) by mixing the precipitate (lanthanum carbonate compound) with a solution containing a zirconium carbonate complex and a compound containing Li as a constituent element.

By this, the ceramic powder material can be in a state in which the respective elements are uniformly dispersed as a whole. In the present invention, it is intended that the respective elements are not uniformly dispersed to the nano-order but the ceramic powder material is in a state in which the respective elements are uniformly dispersed as a whole.

This point will be described.

In the case of trying to uniformly disperse the respective elements to the nano-order, it is considered to be more favorable to obtain (coprecipitate) a precipitate by mixing all the elements. However, when all the elements are mixed, it is not possible to obtain a uniformly dispersed state by factors such as different precipitation rates between the elements and the influence of pH. In particular, according to the study by the present inventors, it has been found out that Zr atoms and La atoms are segregated in some cases. Hence, in the method in which all the elements are mixed and coprecipitated, it is difficult for the ceramic powder material to be in a state in which the respective elements are uniformly dispersed as a whole.

Accordingly, in the present invention, in order that the respective elements are not uniformly dispersed to the nano-order but the ceramic powder material is in a state in which the respective elements are uniformly dispersed as a whole, the steps described above are adopted. In other words, by uniformly supporting a Zr component and a Li component on the surface of a lanthanum carbonate compound, the ceramic powder material is in a state in which the respective elements are uniformly dispersed as a whole.

Thereafter, in the third step, the mixture is calcined at a temperature of 500° C. or more and 900° C. or less to obtain a calcined product.

In the ceramic powder material thus obtained, since the respective elements are uniformly dispersed, Li atoms are suitably eliminated by temperature rise and the main phase of the crystal phase suitably undergoes phase transition from a tetragonal phase to a cubic phase. Consequently, it is possible to obtain a sintered body that is dense and exhibits excellent lithium-ion conductivity under a relatively low temperature condition when a ceramic powder material obtained by the production method described above is used.

In the configuration, it is preferable that, in the ceramic powder material obtained by the method, the number of La atoms with respect to two Zr atoms is more than 3 and 4 or less, and [X−(Y−3)] is 0.14 or more and 0.25 or less, where X is the number of Al atoms with respect to two Zr atoms and Y is the number of La atoms with respect to two Zr atoms.

In a case in which the number of La atoms with respect to two Zr atoms is more than 3 in the ceramic powder material obtained, that is, the optional component contains more than 0 lanthanum atoms, it is possible to easily lower the sintering temperature when the ceramic powder material is sintered since the compound containing La atom acts as a sintering auxiliary.

On the other hand, La atom exhibits low ionic conductivity. Hence, when the number of La atoms with respect to two Zr atoms is 4 or less in the ceramic powder material obtained, that is, the number of La atoms in the optional component is 1 or less, it is possible to keep the ionic conductivity of the sintered body obtained from the ceramic powder material high.

Moreover, when [X−(Y−3)] is set to 0.14 or more and 0.25 or less, it is possible to easily generate a tetragonal phase state before or during the temperature raising step and easily cause phase transition from a tetragonal phase to a cubic phase in the process of raising the temperature to 1050° C. in the ceramic powder material obtained.

The battery according to the present invention includes a sintered body obtained by sintering the ceramic powder material described above.

It is possible to obtain a sintered body that is dense and exhibits excellent lithium-ion conductivity from the ceramic powder material described above under a relatively low temperature condition, and thus a battery (particularly, an all-solid-state lithium-ion secondary battery) including a sintered body obtained by sintering the ceramic powder material is excellent as a battery.

Effect of the Invention

According to the present invention, it is possible to provide a ceramic powder material from which a sintered body that is dense and exhibits excellent lithium-ion conductivity can be obtained under a relatively low temperature condition. It is also possible to provide a method for producing the ceramic powder material. It is also possible to provide a battery including a sintered body obtained by sintering the ceramic powder material.

MODE FOR CARRYING OUT THE INVENTION

Figure 1:
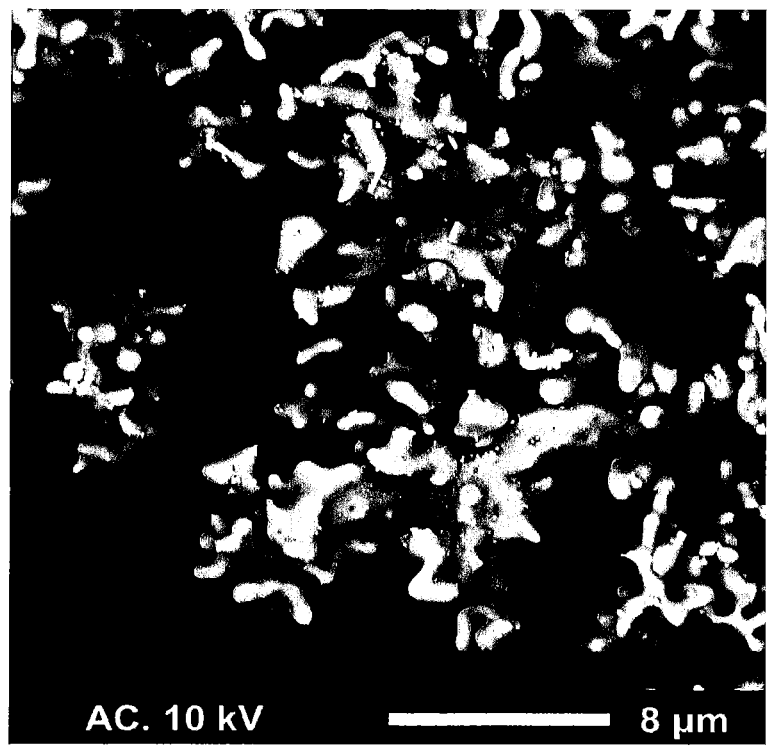
FIG. 1 is a SEM image of a ceramic powder material obtained in Example 2.

Hereinafter, embodiments of the present invention will be described. However, the present invention is not limited only to these embodiments.

[Ceramic Powder Material]

The ceramic powder material according to the present embodiment contains an LLZ-based garnet-type compound represented by $Li_{7-3x}Al_xLa_3Zr_2O_{12}$ (where $0 \leq x \leq 0.3$), and the main phase of the crystal phase of the ceramic powder material undergoes phase transition from a tetragonal phase to a cubic phase in the process of raising the temperature from 25° C. to 1050° C. and the main phase is the cubic phase even after the temperature is lowered to 25° C.

According to the ceramic powder material, it is possible to obtain a sintered body at least at a relatively low temperature of 1050° C. since the main phase of the crystal phase undergoes phase transition from a tetragonal phase to a cubic phase in the process of raising the temperature from 25° C. to 1050° C.

The present inventors presume that the phenomenon that the main phase of the crystal phase undergoes phase transition from a tetragonal phase to a cubic phase occurs since lithium (hereinafter, also referred to as "Li") is eliminated from the LLZ-based garnet-type compound by temperature rise.

The present inventors presume the reason why sintering occurs when the main phase of the crystal phase undergoes phase transition from a tetragonal phase to a cubic phase is that a liquid phase of salts of eliminated Li is uniformly formed on the surface of the LLZ-based garnet-type compound and the existence of this liquid phase further lowers the sintering temperature.

The sintered body obtained under a relatively low temperature condition of 1050° C. becomes a dense molded body since the progress of the decomposition reaction involving melting and volatilization of Li that is the main component is suppressed. The sintered body obtained becomes a sintered body exhibiting excellent lithium-ion conductivity since sintering occurs even under a relatively low temperature condition of 1050° C.

According to the ceramic powder material, it is possible to obtain a sintered body that is dense and exhibits excellent lithium-ion conductivity under a relatively low temperature condition when the ceramic powder material is used since the main phase of the crystal phase undergoes phase transition from a tetragonal phase to a cubic phase in the process of raising the temperature from 25° C. to 1050° C. in this manner.

It is possible to maintain the ionic conductivity high since the main phase is a cubic phase even after the temperature is lowered to 25° C. after the main phase of the crystal phase has undergone phase transition from a tetragonal phase to a cubic phase in the process of raising the temperature from 25° C. to 1050° C. In other words, the ionic conductivity may decrease in a case in which the main phase returns to the tetragonal phase when the temperature is again lowered to 25° C. even if the main phase of the crystal phase has undergone phase transition from a tetragonal phase to a cubic phase in the process of raising the temperature from 25° C. to 1050° C., but it is possible to suppress such a decrease in ionic conductivity and maintain the ionic conductivity high in the ceramic powder material.

The crystal phase (main phase) of the ceramic powder material is confirmed by X-ray diffraction (XRD) measurement.

In the present specification, in the XRD measurement, the diffraction peak observed at 2θ=16.0° to 17.0° is assumed to be a diffraction peak derived from a cubic garnet-type oxide (attributed to ICDD: 045-0109). The intensity of the peak having the highest intensity in the above range is denoted as $I_c$.

In the present specification, in the XRD measurement, the diffraction peak observed at 2θ=27.9° to 28.5° is assumed to be a diffraction peak derived from a tetragonal garnet-type compound (attributed to ICDD: 01-078-6768). The intensity of the peak having the highest intensity in the above range is denoted as $I_t$.

The content ratio ([content of tetragonal garnet-type compound]/[content of cubic garnet-type compound]) of the tetragonal garnet-type compound to the cubic garnet-type compound contained in the ceramic powder material is expressed using the intensity ratio of the respective X-ray diffraction peaks as the following equation.

Content ratio ([content of tetragonal garnet-type compound]/[content of cubic garnet-type compound])=$I_t/I_c$ The main phase is assumed to be a tetragonal phase when $I_t/I_c$ is 0.1 or more, and the main phase is assumed to be a cubic phase when $I_t/I_c$ is less than 0.1.

In other words, in the present specification, it is judged that the main phase of the crystal phase has undergone phase transition from a tetragonal phase to a cubic phase when $I_t/I_c$ changes from 0.1 or more to less than 0.1 in the process of raising the temperature of the ceramic powder material from 25° C. to 1050° C.

In the ceramic powder material, it is preferable that the number of La atoms with respect to two Zr atoms is more than 3 and 4 or less. The number of La atoms with respect to two Zr atoms is more preferably 3.03 or more, still more preferably 3.04 or more, particularly preferably 3.05 or more, extraordinarily preferably 3.10 or more. The number of La atoms with respect to two Zr atoms is more preferably 3.8 or less, still more preferably 3.6 or less.

In the ceramic powder material, it is preferable that [X−(Y−3)] is 0.14 or more and 0.25 or less, where X is the number of Al atoms with respect to two Zr atoms and Y is the number of La atoms with respect to two Zr atoms. [X−(Y−3)] is more preferably 0.15 or more, still more preferably 0.16 or more, particularly preferably 0.17 or more, extraordinarily preferably 0.18 or more. [X−(Y−3)] is more preferably 0.24 or less, still more preferably 0.23 or less, particularly preferably 0.22 or less.

First, "the number of La atoms with respect to two Zr atoms is more than 3 and 4 or less" will be described.

The ceramic powder material contains an LLZ-based garnet-type compound and may contain other components as an optional component.

In the LLZ-based garnet-type compound, namely, $Li_{7-3}Al_xLa_3Zr_2O_{12}$, the number of lanthanum atoms with respect to two Zr atoms is 3, and thus the optional component does not exist or the optional component does not contain La atom even if the optional component exists in a case in which the number of La atoms with respect to two Zr atoms is 3. On the other hand, in a case in which the number of La atoms with respect to two Zr atoms is 4, the optional component contains one La atom with respect to two Zr atoms in the LLZ-based garnet-type compound since the number of La atoms with respect to two Zr atoms in the LLZ-based garnet-type compound is 3.

In other words, the optional component contains more than 0 and 1 or less La atom with respect to two Zr atoms when "the number of La atoms with respect to two Zr atoms is more than 3 and 4 or less".

Moreover, in a case in which "the number of La atoms with respect to two Zr atoms is more than 3", that is, the optional component contains more than 0 lanthanum atoms, it is possible to easily lower the sintering temperature when the ceramic powder material is sintered since the compound containing La atom acts as a sintering auxiliary.

On the other hand, La atom exhibits low ionic conductivity. Hence, when "the number of La atoms with respect to two Zr atoms is 4 or less", that is, the number of La atoms in the optional component is 1 or less, it is possible to keep the ionic conductivity of the sintered body obtained from the ceramic powder material high.

Next, "[X−(Y−3)] is 0.14 or more and 0.25 or less, where X is the number of Al atoms with respect to two Zr atoms and Y is the number of La atoms with respect to two Zr atoms" will be described.

First, the meaning of (Y−3) will be described. (Y−3) means the number of La atoms contained in the optional component (hereinafter, also referred to as "surplus La").

For example, when Y is 3, that is, when the number of La atoms is 3 with respect to two Zr atoms, (Y−3) is "0". This means that La atom does not exist in the optional component. In other words, this means that surplus La does not exist.

On the other hand, when Y is larger than 3, this means that La atoms exist in the optional component by the number (Y−3) with respect to two Zr atoms.

As described above, (Y−3) means the number of lanthanum atoms contained in the optional component per two Zr atoms.

Next, the meaning of [X−(Y−3)] will be described. [X−(Y−3)] actually means the number of aluminum atoms dissolved in the LLZ-based garnet-type compound.

In a case in which surplus La exists in the ceramic powder material, that is, the optional component contains La atom, the same number of Al atoms as that of La atoms are withdrawn from the LLZ-based garnet-type compound and lanthanum aluminate (LaAlO$_3$) and the like are formed as the optional component. Hence, Al atoms are dissolved in the LLZ-based garnet-type compound by the number [X−(Y−3)] obtained by subtracting (Y−3) that is the same number as that of surplus La from the number X of Al atoms existing in the entire ceramic powder material.

Moreover, in a case in which [X−(Y−3)] is 0.14 or more, that is, Al atoms are dissolved in the LLZ-based garnet-type compound by 0.14 or more, the LLZ-based garnet-type compound is likely to be stabilized in a cubic phase.

On the other hand, when the number of Al atoms in the LLZ-based garnet-type compound is too large, a tetragonal phase is not generated. In the present invention, it is assumed that the phase transition from a tetragonal phase to a cubic phase contributes to a decrease in the sintering temperature, and it is thus possible to easily generate a tetragonal phase state before or during the temperature raising step by setting [X−(Y−3)] to 0.25 or less.

When [X−(Y−3)] is set to 0.14 or more and 0.25 or less in this manner, it is possible to easily generate a tetragonal phase state before or during the temperature raising step and easily cause phase transition from a tetragonal phase to a cubic phase in the process of raising the temperature to 1050° C.

It is preferable that the ceramic powder material is subjected to a heat treatment at 1050° C. to obtain a sintered body having a density of 4.6 g/cm$^3$ or more and 5.2 g/cm$^3$ or less. The density is more preferably 4.7 cm$^3$ or more, still more preferably 4.8 cm$^3$ or more, particularly preferably 4.83 cm$^3$ or more, extraordinarily preferably 4.86 cm$^3$ or more. The density is more preferably 5.15 cm$^3$ or less, still more preferably 5.1 cm$^3$ or less. The method for measuring the density follows the method described in Examples.

It is possible to easily obtain a sintered body having a density of 4.6 g/cm$^3$ or more by subjecting the ceramic powder material to a heat treatment at a relatively low temperature of 1050° C. since the main phase of the crystal phase of the ceramic powder material undergoes phase transition from a tetragonal phase to a cubic phase in the process of raising the temperature from 25° C. to 1050° C.

It is preferable that the ceramic powder material is subjected to a heat treatment at 1050° C. to obtain a sintered body having a lithium-ion conductivity of 1×10$^{-5}$ S/cm or more and 1×10$^{-3}$ S/cm or less at a measurement temperature of 30° C. The lithium-ion conductivity is more preferably 7×10$^{-5}$ S/cm or more, still more preferably 1×10$^{-4}$ S/cm or more. The lithium-ion conductivity is more preferably 9×10$^{-4}$ S/cm or less, still more preferably 8×10$^{-4}$ S/cm or less. The method for measuring the lithium-ion conductivity follows the method described in Examples.

It is possible to easily obtain a sintered body having a lithium-ion conductivity of 1×10$^{-5}$ S/cm or more by subjecting the ceramic powder material to a heat treatment at a relatively low temperature of 1050° C. since the main phase of the crystal phase of the ceramic powder material undergoes phase transition from a tetragonal phase to a cubic phase in the process of raising the temperature from 25° C. to 1050° C. A sintered body having a lithium-ion conductivity of 1×10$^{-5}$ S/cm or more can be suitably utilized in, for example, an all-solid-state lithium-ion secondary battery.

The activation energy (Ea) of lithium-ion conduction of the ceramic powder material is preferably 42 kJ/mol or less, more preferably 38 kJ/mol or less, still more preferably 34 kJ/mol or less. It is more preferable as the activation energy (Ea) of the lithium-ion conduction is lower, but the activation energy (Ea) of the lithium-ion conduction can be set to, for example, 15 kJ/mol or more or 18 kJ/mol or more. When the activation energy (Ea) is 42 kJ/mol or less, the ceramic powder material can be suitably used for application to an all-solid-state lithium-ion secondary battery.

The activation energy (Ea) of lithium-ion conduction of the ceramic powder material is calculated by evaluating the temperature dependency of the lithium-ion conductivity ($\sigma_T$). In other words, the activation energy (Ea) of lithium-ion conduction is calculated from the slope of a graph (Arrhenius plot) illustrating the temperature dependency of lithium-ion conductance by the Arrhenius equation: $\sigma = \sigma_0 \exp(-E_a/RT)$ ($\sigma$: lithium-ion conductance, $\sigma_0$: pre-exponential factor, R: gas constant, T: absolute temperature).

[LLZ-Based Garnet-Type Compound]

The ceramic powder material according to the present embodiment contains an LLZ-based garnet-type compound represented by $Li_{7-3x}Al_xLa_3Zr_2O_{12}$ (where $0 \leq x \leq 0.3$) as described above.

From the viewpoint of ionic conductivity, x is preferably greater than 0, more preferably 0.18 or more, still more preferably 0.2 or more. From the viewpoint of ionic conductivity, x is preferably 0.29 or less, more preferably 0.27 or less, still more preferably 0.25 or less.

In a case in which x is 0, the LLZ-based garnet-type compound can be stabilized in a cubic phase by allowing a compound containing a metal element having an oxidation number of 2 or more and an ionic radius in a range (for example, in a range of 40 pm to 70 pm) in which the metal element can be dissolved in Li sites to coexist as a component other than the LLZ-based garnet-type compound and thus forming a structural defect in the garnet structure.

In other words, even when x is 0, it is possible to cause the main phase of the crystal phase to undergo phase transition from a tetragonal phase to a cubic phase in the process of raising the temperature of the ceramic powder material from 25° C. to 1050° C. and stabilize the main phase in the cubic phase as it is even after the temperature is lowered to 25° C. by allowing a compound containing a metal element having an oxidation number of 2 or more and an ionic radius in a range in which the metal element can be dissolved in Li sites to coexist as a component other than the LLZ-based garnet-type compound.

It is preferable that the LLZ-based garnet-type compound contains one or more elements selected from the group consisting of gallium, yttrium, cerium, calcium, barium, strontium, niobium, and tantalum.

When the LLZ-based garnet-type compound contains one or more elements selected from the group consisting of gallium, yttrium, cerium, calcium, barium, strontium, niobium, and tantalum, it is possible to adjust the characteristics of the ceramic powder material to the characteristics according to the required characteristics. [0053]

In a case in which the LLZ-based garnet-type compound contains one or more elements selected from the group consisting of gallium, yttrium, cerium, calcium, barium, strontium, niobium, and tantalum, the LLZ-based garnet-type compound (a) has a structure in which a part of Li, Al, La, and Zr constituting $Li_{7-3x}Al_xLa_3Zr_2O_{12}$ is substituted with one or more elements selected from the group consisting of gallium, yttrium, cerium, calcium, barium, strontium, niobium, and tantalum or (b) is a mixture of an LLZ-based garnet-type compound represented by $Li_{7-3x}Al_xLa_3Zr_2O_{12}$ and an LLZ-based garnet-type compound which contains one or more elements selected from the group consisting of gallium, yttrium, cerium, calcium, barium, strontium, niobium, and tantalum but does not contain Al.

[La Compound]

It is preferable that the ceramic powder material contains a La compound represented by $Li_xLa_{1+2x}Al_{1-x}O_{3+2x}$ (where x is 0 or 0.5) as a component other than the LLZ-based garnet-type compound. It is preferable that the La compound is formed on the particle surface of the LLZ-based garnet-type compound. It is preferable that a plurality of the La compounds are formed on the particle surface of the LLZ-based garnet-type compound.

Figure 2:
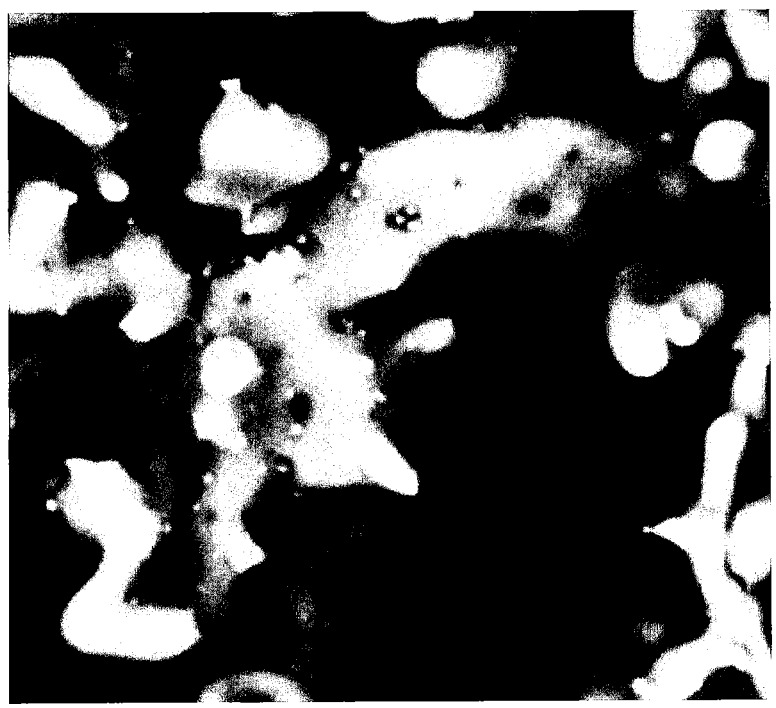
FIG. 2 is a partially enlarged image of FIG. 1.

FIG. 1 is a SEM image of the ceramic powder material of Example 2 to be described later, and FIG. 2 is a partially enlarged image thereof. It is preferable that a plurality of La compounds are uniformly formed on the particle surface of the LLZ-based garnet-type compound as illustrated in FIGS. 1 and 2.

When the ceramic powder material contains a La compound represented by $Li_xLa_{1+2x}Al_{1-x}O_{3+2x}$ (where x is 0 or 0.5), the main phase of the crystal phase of the ceramic powder material more easily undergoes phase transition from a tetragonal phase to a cubic phase in the process of raising the temperature from 25° C. to 1050° C.

With regard to the phase transition, there are a case in which (1) the main phase of the crystal phase of the ceramic powder material is a cubic phase before temperature rise and changes to a tetragonal phase in the process of raising the temperature from 25° C. and further to a cubic phase until the temperature reaches 1050° C. and a case in which (2) the main phase of the crystal phase of the ceramic powder material is a tetragonal phase at the time point at which the temperature is not raised and changes to a cubic phase while the temperature rises from 25° C. to 1050° C.

The phase transition in the cases of (1) and (2) will be described below.

In the case of (1), in the process of raising the temperature of the ceramic powder material from 25° C. to 1050° C., Al is first withdrawn from the LLZ-based garnet-type compound by the La compound and this induces dissolution of Li into the LLZ-based garnet-type compound. At this time, the crystal phase of the LLZ-based garnet-type compound changes from a cubic phase to a tetragonal phase.

When the LLZ-based garnet-type compound in which Li is dissolved is subjected to a heat treatment at a higher temperature, Al withdrawn into the La compound is dissolved again into the LLZ-based garnet-type compound. By this, Li is eliminated from the LLZ-based garnet-type compound and forms a liquid phase (Li salt) on the surface layer of the LLZ-based garnet-type compound. At this time, the crystal phase of the LLZ-based garnet-type compound changes from a tetragonal phase to a cubic phase.

As described above, (1) is a case in which the main phase of the crystal phase of the ceramic powder material is a cubic phase before temperature rise and changes to a tetragonal phase in the process of raising the temperature from 25° C. and further to a cubic phase until the temperature reaches 1050° C.

In the case of (2), in the calcination when the ceramic powder material is produced, Al is first withdrawn from the LLZ-based garnet-type compound by the La compound and this induces dissolution of Li into the LLZ-based garnet-type compound. At this time, the crystal phase of the LLZ-based garnet-type compound changes from a cubic phase to a tetragonal phase. In other words, in the case of (2), the main phase of the ceramic powder material is a tetragonal phase at the time point at which the production of the ceramic powder material is completed, that is, when the ceramic powder material is a product. When the temperature of the ceramic powder material as a product of which the main phase is a tetragonal phase is raised from 25° C. to 1050° C., Al withdrawn into the La compound in the calcination when the ceramic powder material is produced is dissolved again into the LLZ-based garnet-type compound. By this, Li is eliminated from the LLZ-based garnet-type compound and forms a liquid phase (Li salt) on the surface layer of the LLZ-based garnet-type compound. At this time, the crystal phase of the LLZ-based garnet-type compound changes from a tetragonal phase to a cubic phase.

As described above, (2) is a case in which the main phase of the crystal phase of the ceramic powder material is a tetragonal phase at the time point at which the temperature is not raised and changes to a cubic phase while the temperature rises from 25° C. to 1050° C.

The phase transition in the cases of (1) and (2) has been described above.

The existence of the La compound is confirmed by X-ray diffraction (XRD) measurement. In the present specification, in the XRD measurement, it is judged that $LaAlO_3$ exists in a case in which peaks are observed in a range of 2θ=23° to 23.7° and a range of 2θ=41.2° to 41.3° and it is judged that $Li_{0.5}La_2Al_{0.5}O_4$ exists in a case in which peaks are observed in a range of 2θ=24.1° to 24.7°, a range of 2θ=31.67° to 31.77°, and a range of 2θ=44.2° to 44.3°.

[Method for Producing Ceramic Powder Material]

Hereinafter, an example of a method for producing a ceramic powder material will be described. However, the method for producing a ceramic powder material of the present invention is not limited to the following example.

The method for producing a ceramic powder material according to the present embodiment includes:

a first step of mixing a solution of a carbonic acid species, a compound containing La as a constituent element, and a compound containing Al as a constituent element to obtain a precipitate;

a second step of preparing a mixture of the precipitate, a solution containing a zirconium carbonate complex, and a compound containing Li as a constituent element; and a third step of calcining the mixture at a temperature of 500° C. or more and 900° C. or less to obtain a calcined product.

<First Step>

In the method for producing a ceramic powder material according to the present embodiment, a solution of a carbonic acid species, a compound containing La as a constituent element, and a compound containing Al as a constituent element are first mixed to obtain a precipitate (hereinafter, also referred to as "lanthanum carbonate compound") which is a carbonate of La and Al.

The carbonic acid species refers to at least one of carbonic acid ($H_2CO_3$), hydrogencarbonate ion ($HCO_3^-$), or carbonate ion ($CO_3^{2-}$).

Examples of the solution of a carbonic acid species include a solution of a compound containing a carbonic acid species. Examples of the compound containing a carbonic acid species include ammonium hydrogencarbonate, lithium hydrogencarbonate, tetramethylammonium hydrogencarbonate, ammonium carbonate, and carbonic acid gas. Any one of these can be used singly or these can be used in combination of arbitrary two or more thereof.

Examples of the compound (hereinafter, also referred to as "La source") containing La as a constituent element include a water-soluble salt of La element. Examples of the water-soluble salt of La element include lanthanum nitrate, lanthanum acetate, lanthanum chloride, and hydrates of these. The compounds exemplified above can be used singly or in combination of arbitrary two or more thereof and dissolved in pure water or the like to obtain an aqueous solution in which a La source is dissolved.

The La source may be in a solid state or in a solution state. In a case in which the La source is in the form of a solution, the solvent of the La source may be water alone or a mixed solvent of water and an organic solvent such as an alcohol but is preferably water alone from the viewpoint of not using an organic solvent in the entire production. In other words, the La source is preferably an aqueous solution in a case in which the La source is in the form of a solution.

When the La source is dissolved in water, the pH of the aqueous solution may be adjusted using an acid such as nitric acid or hydrochloric acid.

Examples of the compound (hereinafter, also referred to as "Al source") containing Al as a constituent element include a water-soluble salt of Al element. Examples of the water-soluble salt of Al element include aluminum nitrate, aluminum acetate, aluminum chloride, hydrates of these, aluminum oxide, and aluminum hydroxide.

The compounds exemplified above can be used singly or in combination of arbitrary two or more thereof and dissolved in pure water or the like to obtain an aqueous solution in which an Al source is dissolved.

In a case in which the La source is in the form of a solution, the Al source may be dissolved in the solution of the La source. In other words, the first step may be a step of mixing a solution of a carbonic acid species with a solution containing a La source and an Al source.

In the first step, a compound (hereinafter, also referred to as "compound containing element $M^1$ as a constituent element" or "$M^1$ source") containing one or more elements selected from the group consisting of gallium, yttrium, cerium, calcium, barium, strontium, niobium, and tantalum as a constituent element may be mixed.

Examples of the $M^1$ source include water-soluble salts of the element $M^1$. Examples of the water-soluble salts of element $M^1$ include a nitrate, an acetate, a chloride, an oxide, and a hydroxide of the element $M^1$.

The compounds exemplified above can be used singly or in combination of arbitrary two or more thereof and dissolved in pure water or the like to obtain an aqueous solution in which an $M^1$ source is dissolved.

In a case in which the La source and/or Al source is in the form of a solution, the $M^1$ source may be dissolved in a solution of the La source, a solution of the Al source, or a solution containing the La source and the Al source.

The first step has been described above.

<Second Step>

In the second step, a mixture of the precipitate (lanthanum carbonate compound), a solution containing a zirconium carbonate complex, and a compound containing Li as a constituent element is prepared. This makes it possible to uniformly support a Zr component and a Li component on the surface of the precipitate (lanthanum carbonate compound).

By this, the ceramic powder material can be in a state in which the respective elements are uniformly dispersed as a whole. In the present embodiment, it is intended that the respective elements are not uniformly dispersed to the nano-order but the ceramic powder material is in a state in which the respective elements are uniformly dispersed as a whole.

This point will be described. In the case of trying to uniformly disperse the respective elements to the nano-order, it is considered to be more favorable to obtain (coprecipitate) a precipitate by mixing all the elements. However, when all the elements are mixed, it is not possible to obtain a uniformly dispersed state by factors such as different precipitation rates between the elements and the influence of pH. In particular, according to the study by the present inventors, it has been found out that Zr atoms and La atoms are segregated in some cases. Hence, in the method in which all the elements are mixed and coprecipitated, it is difficult for the ceramic powder material to be in a state in which the respective elements are uniformly dispersed as a whole.

Accordingly, in the present embodiment, in order that the respective elements are not uniformly dispersed to the nano-order but the ceramic powder material is in a state in which the respective elements are uniformly dispersed as a whole, the steps described above are adopted. In other words, by uniformly supporting a Zr component and a Li component on the surface of a lanthanum carbonate compound, the ceramic powder material is in a state in which the respective elements are uniformly dispersed as a whole.

In particular, in the second step, heating may be performed in a range of 90 to 200° C. after the mixture has been prepared. By performing the heating, a thickening phenomenon is observed in the mixture. The factor of this is not clear but is presumed to be gelation due to the hydrogen bond network formed by the generation of zirconium hydroxide ($Zr(OH)_4$). By this gelation, it is expected that Li atoms are uniformly incorporated into the gel, and it is thus more likely to obtain a state in which the respective elements are uniformly dispersed.

Thereafter, the mixture may be evaporated to dryness if necessary. The term "evaporation to dryness" as used herein refers to an operation of obtaining a solid substance by evaporating a liquid from a substance containing a solution or a liquid. The method for evaporating to dryness is not particularly limited, and a generally known drying technique can be utilized. Evaporation to dryness can be performed using, for example, a static drying apparatus, a transport type drying apparatus, a rotary drying apparatus, a stirring type drying apparatus, a vacuum drying apparatus, a spray drying apparatus, or a vacuum freeze drying apparatus. The temperature at which evaporation to dryness is performed is not particularly limited but is preferably a temperature in a range of 50 to 200° C., more preferably a temperature in a range of 60 to 150° C., still more preferably a temperature in a range of 70 to 130° C., for example, in the case of using a static drying apparatus.

The solution containing a zirconium carbonate complex can be prepared by mixing at least a compound containing a carbonic acid species and a compound containing a zirconium species (Zr species).

Examples of the compound containing a carbonic acid species include ammonium hydrogencarbonate, lithium hydrogencarbonate, tetramethylammonium hydrogencarbonate, ammonium carbonate, and carbonic acid gas. Any one of these can be used singly or these can be used in combination of arbitrary two or more thereof.

The Zr species means zirconium or zirconium ion. Hereinafter, the compound containing a Zr species is also referred to as "Zr source".

Specific examples of the Zr source include crystals of ammonium zirconium carbonate $((NH_4)_3Zr(OH)(CO_3)_3 \cdot 2H_2O)$, basic zirconium carbonate $(Zr(OH)_{(4-2n)}(CO_3)_n \cdot mH_2O$, n=0.2 to 1.0, m=1 to 10), zirconium oxychloride $(ZrOCl_2)$, or zirconium oxynitrate $(ZrO(NO_3)_2)$, but the Zr source is not limited to these. Any one of these Zr sources can be used singly or these Zr sources can be used in combination of arbitrary two or more thereof. When the Zr source is the above-described zirconium oxychloride, zirconium oxynitrate and the like, hydrates thereof may be used.

The solution containing a zirconium carbonate complex can also be prepared using a compound containing both a carbonic acid species and a Zr species. Examples of the compound containing both a carbonic acid species and a Zr species as used herein include the above-described crystals of ammonium zirconium carbonate $((NH_4)_3Zr(OH)(CO_3)_3 \cdot 2H_2O)$ and basic zirconium carbonate $(Zr(OH)_{(4-2n)}(CO_3)_n \cdot mH_2O$, n=0.2 to 1.0, m=1 to 10). Such a compound containing both a carbonic acid species and a Zr species can be handled as a compound containing a carbonic acid species as well as a Zr source.

In preparation of the solution containing a zirconium carbonate complex, it is preferable to mix the compound containing a carbonic acid species with the Zr source so that the molar ratio of the carbonic acid species to the zirconium species, namely, the value of [number of moles of carbonic acid species/number of moles of zirconium species] is in a range of 1.5 or more and 15.0 or less. This mixing may be performed by mixing the two in a solid state as they are and then dispersing the mixture in a solvent or by a method in which solutions of the two are mixed together. In the case of preparing the solution containing a zirconium carbonate complex using a compound containing both a carbonic acid species and a Zr species, the solution containing a zirconium carbonate complex can be prepared by dissolving this compound in a solvent. In this case, the kind of the compound containing both a carbonic acid species and a Zr species may be selected so that the value of the molar ratio [number of moles of carbonic acid species/number of moles of zirconium species] is in a range of 1.5 or more and 15.0 or less, preferably 2.0 or more and 14.0 or less.

Here, the molar ratio, [number of moles of carbonic acid species/number of moles of zirconium species] is defined in more detail as the value (number of moles of carbonic acid species/number of moles of zirconium species) obtained by dividing the number of moles of carbonic acid species contained in all the raw materials used to prepare the solution of a zirconium carbonate complex by the number of moles of Zr element contained in the Zr source. It is taken into consideration that carbonic acid species and $NR_4^+$ species to be described later may slightly volatilize from the finally prepared aqueous solution to cause a change in concentration. In a case in which crystals of ammonium zirconium carbonate or basic zirconium carbonate are used as the Zr source, the number of moles of carbonic acid species contained therein is also taken into consideration when the molar ratio is calculated.

When a compound containing a carbonic acid species and a Zr source are mixed in the above molar ratio range, the carbonic acid species coordinates the zirconium (IV) ion. For example, in a case in which the carbonic acid species is $CO_3^{2-}$, it is considered that a Zr monomeric complex ion $[Zr(CO_3)_n]^{(2n-4)-}\{9 \geq n \geq 4\}$, a Zr dimeric complex ion $[Zr_2(OH)_2(CO_3)_6]^{6-}$ and the like are formed. A solution containing a zirconium carbonate complex is thus obtained. In the case of using a compound containing both a carbonic acid species and a Zr species as well, a solution containing a zirconium carbonate complex is obtained by forming the above-described complex ions. The formation of zirconium carbonate complex ion can be confirmed by analyzing information on the coordination number, coordination distance, and local structure obtained by extended X-ray absorption fine structure (EXAFS) measurement, Raman spectroscopy, nuclear magnetic resonance (NMR) measurement and the like.

The molar ratio [number of moles of carbonic acid species/number of moles of zirconium species] is more preferably 3.0 or more and 7.0 or less, and a more stable zirconium carbonate complex is formed in this case.

In the solution containing a zirconium carbonate complex, at least one of the counter cations of the zirconium carbonate complex ion is set to $NR_4^+$. Here, R is at least one or more substituents selected from the group consisting of H, $CH_3$, and $CH_2CH_2OH$, Rs may be all the same as one another or all or some of Rs may be different from one another. As such a $NR_4^+$ cation coexists, the zirconium carbonate complex ion can more stably exist in the solution. Specific examples of $NR_4^+$ include ammonium ion ($NH_4^+$), tetramethylammonium ion $((CH_3)_4N^+)$, and 2-hydroxyethyltrimethylammonium ion $((CH_3)_3N(CH_2CH_2OH)^+)$, but $NR_4^+$ is not limited to these. Among these, ammonium ion ($NH_4^+$) is preferable as $NR_4^+$ from the viewpoint of low price of the raw material. In order to set $NR_4^+$ as the counter cation of the zirconium carbonate complex ion, for example, a material capable of providing $NR_4^+$ to the solution may be added when the solution containing a zirconium carbonate complex ion is prepared. Examples of the material capable of providing $NR_4^+$ to the solution include ammonium hydroxide ($NH_4OH$, aqueous ammonia), tetramethylammonium hydroxide $((CH_3)_4N(OH))$, and choline hydroxide $((CH_3)_3N(CH_2CH_2OH)(OH))$, but the material capable of providing $NR_4^+$ to the solution is not limited to these. These can be used singly or in combination of arbitrary two or more thereof. As the material capable of providing $NR_4^+$ to the solution, any one or more of ammonium hydrogencarbonate, tetramethylammonium hydrogencarbonate, ammonium carbonate or the like may be used concurrently.

In preparation of the solution containing a zirconium carbonate complex, compounds other than the compound containing a carbonic acid species and the Zr source, for example, a chelating agent may be added as long as the formation of the zirconium carbonate complex is not inhibited. The existence of chelating agent improves the stability of the aqueous solution of zirconium carbonate complex and can suppress the consumption of Zr due to autohydrolysis. Examples of the chelating agent include ethanolamines such as monoethanolamine, diethanolamine, and triethanolamine and organic acids such as tartaric acid, citric acid, lactic acid, gluconic acid, and glycolic acid or salts of ethanolamines and salts of organic acids. These can be used singly or two or more thereof can be used concurrently The molar ratio (chelating agent/Zr) of the chelating agent to zirconium can be set to 0.01 to 1.

The pH of the solution containing a zirconium carbonate complex is preferably 7.0 or more and 9.5 or less. When the pH is 7.0 or more, the solution containing a zirconium carbonate complex can efficiently form a precipitate with an acidic aqueous solution. When the pH is 9.5 or less, the concentration of free hydroxide ions existing in the solution of a zirconium carbonate complex is sufficiently low and the generation of precipitate as a hydroxide can be suppressed. The pH can be adjusted by the blending ratio of various raw materials for preparation of the solution of a zirconium carbonate complex and the amount of solvent, and the pH may be adjusted by addition of a pH adjusting agent and the like.

Examples of the compound containing Li as a constituent element (hereinafter, also referred to as "Li source") include lithium oxide, lithium hydroxide, lithium chloride, lithium carbonate, lithium hydrogencarbonate, lithium nitrate, lithium sulfate, lithium acetate, lithium citrate ($Li_3C_6H_5O_7$), and lithium oxalate ($Li_2(COO)_2$), but the compound containing Li as a constituent element is not limited to these. In the case of using various Li salts exemplified above as the Li source, the Li source may be hydrates of these.

The Li source may be a solution containing the Li source. Examples thereof include aqueous solutions of the Li source salts.

The second step has been described above.

<Third Step>

Thereafter, in the third step, the mixture is calcined at a temperature of 500° C. or more and 900° C. or less to obtain a calcined product. Calcination can be performed in an air atmosphere, for example. The calcination temperature is preferably 600° C. or more, more preferably 700° C. or more. The calcination temperature is preferably 900° C. or less, more preferably 850° C. or less. The calcined product obtained is a ceramic powder material containing an LLZ-based garnet-type compound. Moreover, the ceramic powder material obtained by performing calcination at a temperature of 900° C. or less may be in the form of particles. It can be confirmed that the ceramic powder material which is the calcined product obtained is in the form of particles by scanning electron microscopy. Specifically, it can be judged that the ceramic powder material is in the form of particles when the size of the primary particles observed in the scanning electron micrograph is 20 μm or less.

The mixture may be ground after the second step and before calcination. However, the form and dispersed state of the La compound in the ceramic powder material obtained are the same even in a case in which the mixture is ground after the second step and before calcination or in a case in which the mixture is not ground. In other words, grinding of the mixture after being subjected to the second step but before being calcined is not essential. In Examples to be described later, the mixture after being subjected to the second step but before being calcined is ground in order to obtain SEM images as illustrated in FIGS. 1 and 2. In a case in which the mixture is ground after the second step and before calcination, the shape of the ceramic powder material obtained is a plate shape.

In the ceramic powder material thus obtained, since the respective elements are uniformly dispersed, Li atoms are suitably eliminated by temperature rise and the main phase of the crystal phase suitably undergoes phase transition from a tetragonal phase to a cubic phase. Consequently, it is possible to obtain a sintered body that is dense and exhibits excellent lithium-ion conductivity under a relatively low temperature condition when a ceramic powder material obtained by the production method described above is used.

The third step has been described above.

In the above-described embodiment, a case in which a compound containing an element $M^1$ as a constituent element is mixed in the first step has been described in the case of containing one or more elements selected from the group consisting of gallium, yttrium, cerium, calcium, barium, strontium, niobium, and tantalum in the LLZ-based garnet-type compound. However, the method for producing a ceramic powder material is not limited to this example. For example, an LLZ-based garnet-type compound represented by $Li_{7-3x}Al_xLa_3Zr_2O_{12}$ and an LLZ-based garnet-type compound which contains one or more elements selected from the group consisting of gallium, yttrium, cerium, calcium, barium, strontium, niobium, and tantalum but does not contain Al may be produced and mixed. In order to obtain the LLZ-based garnet-type compound which contains one or more elements selected from the group consisting of gallium, yttrium, cerium, calcium, barium, strontium, niobium, and tantalum but does not contain Al, it is only required to mix a compound containing one or more elements selected from the group consisting of gallium, yttrium, cerium, calcium, barium, strontium, niobium, and tantalum as a constituent element instead of mixing a compound containing Al as a constituent element in the first step of the above-described embodiment.

An example of the method for producing a ceramic powder material has been described above.

The sintered body according to the present embodiment is obtained by sintering the ceramic powder material described above. The sintering condition is not particularly limited, but sintering by a heat treatment at a relatively low temperature of 1050° C. or less is preferable. This is because the ceramic powder material is not required to be treated at a temperature higher than 1050° C. since the main phase of the crystal phase thereof undergoes phase transition from a tetragonal phase to a cubic phase in the process of raising the temperature from 25° C. to 1050° C. The sintering condition is preferably 900° C. or more, more preferably 950° C. or more.

However, the sintering condition when the sintered body according to the present embodiment is obtained may be set to a temperature higher than 1050° C. For example, the sintering condition may be set to 1200° C. or less or 1100° C. or less.

The density of the sintered body is preferably 4.6 g/cm³ or more and 5.2 g/cm³ or less. The density is more preferably 4.8 cm³ or more, still more preferably 4.9 cm³ or more. The density is more preferably 5.15 cm³ or less, still more preferably 5.1 cm³ or less.

It is preferable that the lithium-ion conductivity of the sintered body is $1\times10^{-5}$ S/cm or more and $1\times10^{-3}$ S/cm or less at a measurement temperature of 30° C. The lithium-ion conductivity is more preferably $7\times10^{-5}$ S/cm or more, still more preferably $1\times10^{-4}$ S/cm or more. The lithium-ion conductivity is more preferably $9\times10^{-4}$ S/cm or less, still more preferably $8\times10^{-4}$ S/cm or less.

The activation energy (Ea) of lithium-ion conduction of the sintered body is preferably 42 kJ/mol or less. The activation energy (Ea) of the lithium-ion conduction is more preferably 38 kJ/mol or less, still more preferably 34 kJ/mol or less. It is more preferable as the activation energy (Ea) of the lithium-ion conduction is lower, but the activation energy (Ea) of the lithium-ion conduction can be set to, for example, 15 kJ/mol or more or 18 kJ/mol or more.

[All-Solid-State Lithium-Ion Secondary Battery]

Next, an example of the embodiment of an all-solid-state lithium-ion secondary battery will be described.

The all-solid-state lithium-ion secondary battery of the present embodiment includes:

a positive electrode layer containing a positive electrode active material;

a negative electrode layer containing a negative electrode active material; and a solid electrolyte layer interposed between the positive electrode layer and the negative electrode layer.

At least one of the positive electrode layer, the negative electrode layer, or the solid electrolyte layer contains a sintered body obtained by sintering the ceramic powder material described above.

Hereinafter, the all-solid-state lithium-ion secondary battery of the present embodiment will be described for every configuration.

(Positive Electrode Layer)

The positive electrode layer is a layer containing at least a positive electrode active material and may further contain at least one of a lithium-ion conductive material, an electron conduction auxiliary, or a binder if necessary.

The lithium-ion conductive material contained in the positive electrode layer is preferably a sintered body obtained by sintering the ceramic powder material described above. The content of the sintered body in the positive electrode layer is not particularly limited but can be, for example, in a range of 0.1% by volume to 80% by volume with respect to the entire volume of the positive electrode layer. Among these, the content is preferably in a range of 1% by volume to 60% by volume, more preferably in a range of 10% by volume to 50% by volume. The thickness of the positive electrode layer is not particularly limited but is preferably in a range of, for example, 0.1 µm to 1000 µm. It is difficult to increase the capacity of the all-solid-state lithium-ion secondary battery when the positive electrode layer is thinner than 0.1 µm, and it is difficult to form a homogeneous layer when the positive electrode layer has a thickness exceeding 1000 µm.

The positive electrode active material is not particularly limited as long as it is a material capable of storing and releasing electrochemical Li ions, but it is preferable to use sulfur or lithium sulfide ($Li_2S$) having a large theoretical capacity from the viewpoint of increasing the capacity of the all-solid-state lithium-ion secondary battery. A Li-containing oxide material may be used from the viewpoint of increasing the operating voltage of the all-solid-state lithium-ion secondary battery. Specifically, it is possible to use layered rock salt-type oxides such as $LiCoO_2$, $LiMnO_2$, $LiNiO_2$, $LiVO_2$, $Li(Ni_xCo_yMn_z)O_2(x+y+z=1)$, and $Li(Ni_x Co_y Al_z)O_2(x+y+z=1)$, spinel-type oxides such as $LiMn_2O_4$ and $Li(Ni_{0.5}Mn_{1.5})O_4$, olivin-type phosphates such as $LiFePO_4$, $LiMnPO_4$, $LiNiPO_4$, and $LiCuPO_4$, and silicates such as $Li_2FeSiO_4$ and $Li_2MnSiO_4$. As the positive electrode active material, the above-described materials may be used singly or in combination of arbitrary two or more thereof.

The content of the positive electrode active material in the positive electrode layer is preferably in a range of, for example, 10% by volume to 99% by volume with respect to the entire volume of the positive electrode layer. The content is more preferably in a range of 20% by volume to 99% by volume. The shape of the positive electrode active material can be, for example, a particle shape. The average particle size thereof is preferably in a range of, for example, 0.05 µm to 50 µm.

The positive electrode layer may further contain at least one of an electron conduction auxiliary or a binder in addition to the positive electrode active material and the lithium-ion conductive material. As the electron conduction auxiliary, a material exhibiting high electron conductivity is preferable, and examples thereof include acetylene black, ketjen black, and carbon fibers. As the binder, for example, polyvinylidene fluoride, polytetrafluoroethylene, polyvinyl alcohol, polyvinyl acetate, polymethylmethacrylate, and polyethylene can be used.

The positive electrode layer can be fabricated by mixing the components (the above-described positive electrode active material, lithium-ion conductive material, electron conduction auxiliary, binder and the like) and molding the mixture. At this time, sintering may be performed if necessary. The method for mixing the components of the positive electrode layer is not particularly limited, and any general powder technique can be used. At this time, water or arbitrary organic solvents may be used as the dispersion solvent. The method for molding and sintering the mixture of the components of the positive electrode layer is not particularly limited, and generally known molding and sintering methods can be used. The positive electrode layer may be fabricated on the solid electrolyte layer. In this case, sintering of the positive electrode layer can be performed in the form of integral sintering with the solid electrolyte layer. Here, integral sintering is a method in which one of the "lithium-ion conductive material constituting the solid electrolyte layer" or the "mixture of the components of the positive electrode layer" is molded, the other is molded thereon, pressing is performed if necessary, and then sintering is performed.

The positive electrode current collector for collecting electrical power of the positive electrode layer can be provided, for example, on the surface on the opposite side to the surface on which the solid electrolyte layer is disposed of the positive electrode layer. Examples of the material for the positive electrode current collector include stainless steel, aluminum, nickel, iron, and carbon. Among these, stainless steel is preferable.

(Negative Electrode Layer)

The negative electrode layer is a layer containing at least a negative electrode active material and may further contain at least one of a lithium-ion conductive material, an electron conduction auxiliary, or a binder if necessary.

The lithium-ion conductive material contained in the negative electrode layer is preferably the sintered body described above (a sintered body obtained by sintering the ceramic powder material described above). The content of the sintered body in the negative electrode layer is not particularly limited but can be, for example, in a range of 0.1% by volume to 80% by volume with respect to the entire volume of the negative electrode layer. Among these, the content is preferably in a range of 1% by volume to 60% by volume, more preferably in a range of 10% by volume to 50% by volume. The thickness of the negative electrode layer is not particularly limited but is preferably in a range of, for example, 0.1 µm to 1000 µm.

The negative electrode active material is not particularly limited as long as it is a material capable of storing and releasing electrochemical Li ions, but it is preferable to use a metal material having a large theoretical capacity from the viewpoint of increasing the capacity of the all-solid-state lithium-ion secondary battery. Examples of the metal material include metals such as Li, Si, Sn, and In and alloys of these. Among these, metal Li has the largest theoretical capacity and is thus preferable. Ti-based materials such as titanium oxide and lithium titanate that are excellent in reversible operation of the battery may be used. Specific examples of Ti-based materials include $TiO_2$, $H_2Ti_{12}O_{25}$, and $Li_4Ti_5O_{12}$. Inexpensive carbon-based materials can also be used. Specific examples of the carbon-based materials include natural graphite, artificial graphite, non-graphitizable carbon, and graphitizable carbon. As the negative electrode active material, the above-described materials may be used singly or in combination of arbitrary two or more thereof.

The content of the negative electrode active material in the negative electrode layer is preferably in a range of, for example, 10% by volume to 99% by volume with respect to the entire volume of the negative electrode layer. The content is more preferably in a range of 20% by volume to 99% by volume. The shape of the negative electrode active material can be, for example, a particle shape, a foil shape, or a film shape. In a case in which the shape of the negative electrode active material is a particle shape, the average particle size thereof is preferably in a range of, for example, 0.05 μm to 50 μm.

The negative electrode layer may further contain at least one of an electron conduction auxiliary or a binder in addition to the negative electrode active material and the lithium-ion conductive material. As the electron conduction auxiliary and the binder, those used in the positive electrode layer described above can be used in the same manner.

The negative electrode layer can be fabricated by mixing the components (the above-described negative electrode active material, lithium-ion conductive material, electron conduction auxiliary, binder and the like) and molding the mixture. At this time, sintering may be performed if necessary. The method for mixing the components of the negative electrode layer is not particularly limited, and any general powder process can be used. At this time, water or arbitrary organic solvents may be used as the dispersion solvent. The method for molding and sintering the mixture of the components of the negative electrode layer is not particularly limited, and generally known molding and sintering methods can be used. In a case in which the shape of the negative electrode active material is a foil shape, a film shape, or the like, the negative electrode layer may be formed by the method for forming the negative electrode layer described above, but the negative electrode active material itself may be regarded as the negative electrode layer by itself. The negative electrode layer may be fabricated on the solid electrolyte layer. In this case, sintering of the negative electrode layer can be performed in the form of integral sintering with the solid electrolyte layer. Here, integral sintering is a method in which one of the "lithium-ion conductive material constituting the solid electrolyte layer to be described later" or the "mixture of the components of the negative electrode layer" is first molded, the other is molded thereon, and then sintering is performed.

The negative electrode current collector for collecting electrical power of the negative electrode layer can be provided, for example, on the surface on the opposite side to the surface on which the solid electrolyte layer is disposed of the negative electrode layer. Examples of the material for the negative electrode current collector include stainless steel, copper, nickel, and carbon. Among these, stainless steel is preferable.

(Solid Electrolyte Layer)

The solid electrolyte layer is a layer interposed between the positive electrode layer and the negative electrode layer and is a layer formed of a lithium-ion conductive material. The lithium-ion conductive material contained in the solid electrolyte layer is not particularly limited as long as it exhibits lithium-ion conductivity.

The lithium-ion conductive material contained in the solid electrolyte layer is preferably the sintered body described above (a sintered body obtained by sintering the ceramic powder material described above). The content of the sintered body in the solid electrolyte layer is not particularly limited as long as it is a proportion at which the electron conductivity can be sufficiently suppressed but is preferably in a range of, for example, 50% by volume to 100% by volume.

The solid electrolyte layer can also contain a lithium-ion conductive material other than the sintered body. Specific examples thereof include NASICON-type compounds such as $Li_{1.3}Al_{0.3}Ti_{1.7}(PO_4)_3$, $Li_{1.5}Al_{0.5}Ge_{1.5}(PO_4)_3$, $LiZr_2(PO_4)_3$, $Li_{1.2}Ca_{0.1}Zr_{1.9}(PO_4)_3$, and $Li_{1.15}Y_{0.15}Zr_{1.85}(PO_4)_3$, lithium-ion conductive oxide glass such as $Li_2O$—$B_2O_3$-based glass, $Li_2O$—$SiO_2$-based glass, $Li_2O$—$P_2O_5$-based glass, and $Li_{2.9}PO_{3.3}N_{0.46}$-based glass (LIPON), and lithium-ion conductive sulfide glass such as $Li_2S$—$B_2S_3$-based glass, $Li_2S$—$SiS_2$-based glass, and $Li_2S$—$P_2S_5$-based glass. lithium-ion conductive oxide glass and lithium-ion conductive sulfide glass can also be crystallized and used as a glass-ceramic material.

The thickness of the solid electrolyte layer is not particularly limited as long as it is a thickness capable of preventing a short circuit of the all-solid-state lithium-ion secondary battery but can be, for example, in a range of 0.1 μm to 1000 μm. Among these, the thickness is preferably in a range of 0.1 μm to 300 μm.

The solid electrolyte layer can be fabricated by molding and sintering the above-described lithium-ion conductive material. The method for molding and sintering the lithium-ion conductive material constituting the solid electrolyte layer is not particularly limited, and generally known molding and sintering methods can be used. The sintering temperature is not particularly limited but is preferably a temperature in a range of 700 to 1200° C., more preferably a temperature in a range of 700 to 1100° C., still more preferably a temperature in a range of 700 to 1000° C., for example, in a case in which the lithium-ion conductive material is the above-described ceramic powder material. However, 1050° C. or less is preferable and 1000° C. or less is more preferable from the viewpoint of suppressing the decomposition reaction involving melting and volatilization of Li. The sintering density of the solid electrolyte layer is preferably 60% or more, more preferably 70% or more, still more preferably 80% or more, yet still more preferably 90% or more with respect to the theoretical density. This is because the resistance can be further suppressed as the sintering density is higher. When sintering of the solid electrolyte layer is performed, it is preferable to perform integral sintering with at least one of the above-described positive electrode layer or negative electrode layer. This is because the resistance at the layer interface can be lowered by integral sintering.

(Configuration of All-Solid-State Lithium-Ion Secondary Battery)

The shape of the all-solid-state lithium-ion secondary battery can be, for example, a coin type, a laminate type, a cylindrical type, or a square type.

The method for manufacturing the all-solid-state lithium-ion secondary battery of the present embodiment is not particularly limited as long as it is a method capable of constructing the all-solid-state lithium-ion secondary battery described above, and a method similar to the general method for manufacturing an all-solid-state lithium-ion secondary battery can be used. For example, the all-solid-state lithium-ion secondary battery of the present embodiment is manufactured by laminating the above-described positive electrode layer, solid electrolyte layer, and negative electrode layer in this order.

According to the all-solid-state lithium-ion secondary battery of the present embodiment, the sintered body described above is contained, thus the internal resistance of the battery is suppressed by the high lithium-ion conductance of the garnet-type compound and the battery performance such as rate characteristics is improved. The ceramic powder material is in the form of fine particles, and thus the contact interface with the electrode active material can be sufficiently secured as the ceramic powder material is contained in the electrode layer. Consequently, the ion conduction path to the electrode active material is favorably constructed, the proportion of the electrode active material which cannot contribute to the battery reaction decreases, and thus the energy density of the battery is improved.

In the embodiment described above, a case in which the above-described ceramic powder material is used in an all-solid-state lithium-ion secondary battery has been described. However, the battery according to the present invention is not limited to the all-solid-state lithium-ion secondary battery as long as it contains a sintered body obtained by sintering the above-described ceramic powder material.

EXAMPLES

Hereinafter, the present invention will be described in detail with reference to Examples, but the present invention is not limited to the following Examples as long as the gist of the present invention is not exceeded.

[Raw Materials]

The following raw materials were prepared for producing the ceramic powder materials of Examples and Comparative Examples.

<First Raw Material (Zr Source)>

An aqueous solution of ammonium zirconium carbonate (hereinafter referred to as AZC aqueous solution) prepared as follows was used as the Zr source.

Basic zirconium carbonate $(Zr(OH)_{3.2}(CO3)_{0.4} \cdot 7H_2O)$ manufactured by DAIICHI KIGENSO KAGAKU KOGYO CO., LTD.), ammonium hydrogencarbonate that was a carbonic acid species, and tartaric acid that was a chelating agent were dissolved in pure water, and the pH of the solution was adjusted to 8.0 using ammonium water. Here, the molar ratio (number of moles of carbonic acid species/number of moles of Zr) was set to 6.59, and the molar ratio (number of moles of tartaric acid/number of moles of Zr) was set to 0.06. The AZC aqueous solution thus obtained was an aqueous solution of zirconium carbonate-$NH_4$ complex, and the Zr concentration therein was 1.96% by mass.

Zirconium compounds usually contain a hafnium component as an inevitable component. Hafnium is contained in the AZC aqueous solution and the ceramic powder materials obtained in the following Examples and Comparative Examples at a proportion to zirconium of 0.03 as a molar ratio (number of moles of Hf/number of moles of Zr). In the ceramic powder material produced, the hafnium component is not observed as an impurity compound but is considered to exist at the zirconium position in the crystal structure of the ceramic powder material. Consequently, in the following Examples and Comparative Examples, the Zr concentration is expressed as the sum of the concentrations of zirconium and hafnium unless otherwise stated. Zr in the composition ratio means the sum of zirconium and hafnium.

<Second Raw Material (La Source)>

As the La source, a $La(NO_3)_3$ aqueous solution (La concentration: 16.2%) was used.

<Third Raw Material (Al Source)>

As the Al source, an $Al(NO_3)_3$ aqueous solution (Al concentration: 10%) was used.

<Fourth Raw Material (Li Source)>

As the Li source, a $LiNO_3$ aqueous solution (Li concentration: 3.2%) was used.

<Fifth Raw Material (Ga Source)>

As the Ga source, a $Ga(NO_3)_3$ aqueous solution (Ga concentration: 6.5%) was used.

[Fabrication of Ceramic Powder Material]

Example 1

<First Step: Fabrication of Precipitate>

In 200 g of water, 50.0 g of ammonium hydrogencarbonate was dissolved, and a mixed solution of 76.29 g of the $La(NO_3)_3$ aqueous solution and 3.16 g of the $Al(NO_3)_3$ aqueous solution was added thereto dropwise at 10 mL per minute to obtain a slurry containing a precipitate.

<Second Step: Fabrication of Mixture>

The obtained slurry containing a precipitate was suction-filtered, the filtered substance was washed with 2000 mL of pure water, water was removed, and the precipitate was thus separated from the slurry. To the precipitate obtained, 272.46 g of the AZC aqueous solution and 42.16 g of the $LiNO_3$ aqueous solution were added, and the precipitate was dispersed by stirring, thereby preparing a slurry. This slurry was heated and dried at 100° C. to obtain a mixture as a dry powder.

<Third Step: Fabrication of Calcined Product>

The mixture was ground using a ball mill and then calcined at 800° C. for 3 hours, thereby obtaining a ceramic powder material according to Example 1. The composition of the ceramic powder material calculated from the respective raw materials is as presented in Table 1.

Example 2

A ceramic powder material according to Example 2 was obtained by the same method as in Example 1 except that the amount of $La(NO_3)_3$ aqueous solution used was changed to 76.55 g, the amount of $Al(NO_3)_3$ aqueous solution used was changed to 3.39 g, the amount of AZC aqueous solution used was changed to 271.57 g, and the amount of $LiNO_3$ aqueous solution used was changed to 41.39 g.

Example 3

A ceramic powder material according to Example 3 was obtained by the same method as in Example 1 except that the amount of $La(NO_3)_3$ aqueous solution used was changed to 76.91 g, the amount of $Al(NO_3)_3$ aqueous solution used was changed to 3.84 g, the amount of AZC aqueous solution used was changed to 269.35 g, and the amount of $LiNO_3$ aqueous solution used was changed to 40.42 g.

Example 4

A ceramic powder material according to Example 4 was obtained by the same method as in Example 1 except that the amount of La(NO$_3$)$_3$ aqueous solution used was changed to 76.29 g, the amount of Al(NO$_3$)$_3$ aqueous solution used was changed to 4.34 g, the amount of AZC aqueous solution used was changed to 262.91 g, and the amount of LiNO$_3$ aqueous solution used was changed to 43.74 g.

Example 5

A ceramic powder material according to Example 5 was obtained by the same method as in Example 1 except that the amount of La(NO$_3$)$_3$ aqueous solution used was changed to 79.14 g, the amount of Al(NO$_3$)$_3$ aqueous solution used was changed to 7.58 g, the amount of AZC aqueous solution used was changed to 242.69 g, and the amount of LiNO$_3$ aqueous solution used was changed to 37.89 g.

Example 6

<First Step: Fabrication of Precipitate>

In 200 g of water, 50.0 g of ammonium hydrogencarbonate was dissolved, and a mixed solution of 75.24 g of the La(NO$_3$)$_3$ aqueous solution, 2.84 g of the Al(NO$_3$)$_3$ aqueous solution, and 0.41 g of the Ga(NO$_3$)$_3$ aqueous solution was added thereto dropwise at 10 mL per minute, thereby obtaining a slurry containing a precipitate.

<Second Step: Fabrication of Mixture>

The obtained slurry containing a precipitate was suction-filtered, the filtered substance was washed with 2000 mL of pure water, water was removed, and the precipitate was thus separated from the slurry. To the precipitate obtained, 272.44 g of the AZC aqueous solution and 40.86 g of the LiNO$_3$ aqueous solution were added, and the precipitate was dispersed by stirring, thereby preparing a slurry. This slurry was heated and dried at 100° C. to obtain a mixture as a dry powder.

<Third Step: Fabrication of Calcined Product>

The mixture was ground using a ball mill and then calcined at 800° C. for 3 hours, thereby obtaining a ceramic powder material according to Example 6.

Comparative Example 1

A ceramic powder material according to Comparative Example 1 was obtained by the same method as in Example 1 except that the amount of La(NO$_3$)$_3$ aqueous solution used was changed to 75.88 g, the amount of Al(NO$_3$)$_3$ aqueous solution used was changed to 2.96 g, the amount of AZC aqueous solution used was changed to 276.43 g, and the amount of LiNO$_3$ aqueous solution used was changed to 42.13 g.

Comparative Example 2

A ceramic powder material according to Comparative Example 2 was obtained by the same method as in Example 1 except that the amount of La(NO$_3$)$_3$ aqueous solution used was changed to 75.39 g, the amount of Al(NO$_3$)$_3$ aqueous solution used was changed to 4.42 g, the amount of AZC aqueous solution used was changed to 275.54 g, and the amount of LiNO$_3$ aqueous solution used was changed to 41.22 g.

Figure 3:
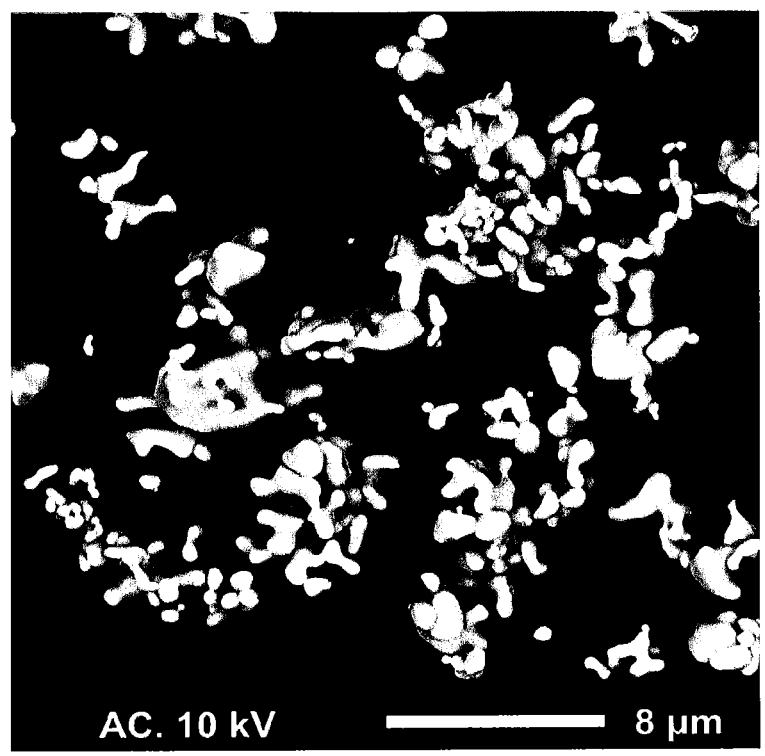
FIG. 3 is a SEM image of a ceramic powder material obtained in Comparative Example 1.
Figure 4:
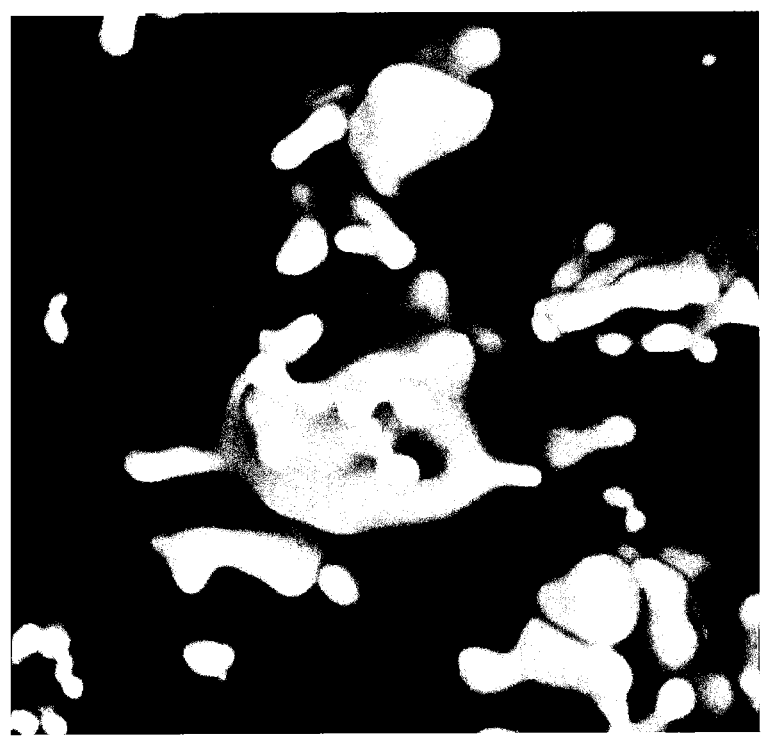
FIG. 4 is a partially enlarged image of FIG. 3.

FIG. 1 illustrates a SEM image of the ceramic powder material obtained in Example 2, and FIG. 2 illustrates a partially enlarged image thereof. FIG. 3 illustrates a SEM image of the ceramic powder material obtained in Comparative Example 1, and FIG. 4 illustrates a partially enlarged image thereof. In the SEM image, the black part of the background is the carbon tape used for fixing the powder material and the ceramic powder material does not exist at the black part.

As illustrated in FIGS. 1 and 2, in the ceramic powder material of Example 2, it has been confirmed that a plurality of small particles are uniformly formed on the particle surface of the LLZ-based garnet-type compound. From the results of the X-ray diffraction spectrum to be described later, these small particles are presumed to be a La compound. Although not illustrated, in other Examples as well, it has been confirmed that a plurality of small particles are uniformly formed on the particle surface of the LLZ-based garnet-type compound in the same manner as in Example 2.

On the other hand, as illustrated in FIGS. 3 and 4, in the SEM image of the ceramic powder material of Comparative Example 1, small particles as those in Example 2 have not been confirmed on the particle surface of the LLZ-based garnet-type compound. Although not illustrated, in other Comparative Examples as well, small particles as those in Example 2 have not been confirmed on the particle surface of the LLZ-based garnet-type compound.

[Identification of Crystal Phase]

(Crystal Phase of Ceramic Powder Material Before Heat Treatment)

X-ray diffraction spectra of the ceramic powder materials of Examples and Comparative Examples were obtained using an X-ray diffractometer ("RINT2500" manufactured by Rigaku Corporation). The measurement conditions were as follows.

<Measurement Conditions>

Measuring instrument: X-ray diffractometer (RINT2500 manufactured by Rigaku Corporation)

Radiation source: CuKα radiation source

Tube voltage: 50 kV

Tube current: 300 mA

Scanning speed: 4° (2θ)/min

In the X-ray diffraction spectra, the diffraction peak observed at 2θ=16.0° to 17.0° was a diffraction peak derived from a cubic garnet-type oxide (attributed to ICDD: 045-0109) and the intensity of the peak having the highest intensity in this range was denoted as $I_c$.

In the X-ray diffraction spectra, the diffraction peak observed at 2θ=27.9° to 28.5° was a diffraction peak derived from a tetragonal garnet-type compound (attributed to ICDD: 01-078-6768) and the intensity of the peak having the highest intensity in this range was denoted as $I_t$.

The content ratio ([content of tetragonal garnet-type compound]/[content of cubic garnet-type compound]) of the tetragonal garnet-type compound to the cubic garnet-type compound contained in the ceramic powder material was expressed using the intensity ratio of the respective X-ray diffraction peaks as the following equation. The results are presented in Table 1.

Content ratio ([content of tetragonal garnet-type compound]/[content of cubic garnet-type compound])=$I_t/I_c$ The main phase was assumed to be a tetragonal phase when $I_t/I_c$ was 0.1 or more, and the main phase was assumed to be a cubic phase when $I_t/I_c$ was less than 0.1. The results are presented in Table 1.

(Crystal Phase of Ceramic Powder Material After Heat Treatment at 900° C.)

First, as a pretreatment, the ceramic powder materials of Examples and Comparative Examples were ground using a planetary ball mill under the following conditions.

<Grinding Conditions>
Apparatus: Planetary Ball Mill (PULVERISETTE 6 Manufactured by FRITSCH GmbH)
Speed of rotation: 400 rpm
Grinding time: 30 min The powder obtained by grinding was molded into a columnar shape by cold pressing and pressed by a cold isostatic pressing method to obtain a molded body for sintering.
<Cold Pressing Conditions>
Apparatus name: 100kN Newton Press (NT-100H-V09 manufactured by NPa SYSTEM CO., LTD.)
Molding pressure: 14 MPa
Mold: φ=20 mm
<Cold Isostatic Pressing Method Conditions>
Apparatus name: CIP apparatus for small research, Dr. CIP (manufactured by KOBELCO)
Molding pressure: 245 MPa The molded body for sintering obtained was subjected to a heat treatment at 900° C. for 25 hours. After that, the temperature was lowered to 25° C. to obtain a columnar sintered body.

The columnar sintered body obtained was ground using a mortar and powderized, and the X-ray diffraction spectrum of this powderized sintered body was obtained by a similar method to that described in the section of "crystal phase of ceramic powder material before heat treatment".

The content ratio ([content of tetragonal garnet-type compound]/[content of cubic garnet-type compound]) of the tetragonal garnet-type compound to the cubic garnet-type compound contained in the ceramic powder material after being subjected to a heat treatment at 900° C. was determined by a similar method to that described in the section of "crystal phase of ceramic powder material before heat treatment".

Whether the crystal phase of the main phase was a cubic phase or a tetragonal phase was evaluated by similar criteria to those described in the section of "crystal phase of ceramic powder material before heat treatment". The results are presented in Table 1.

(Crystal Phase of Ceramic Powder Material After Heat Treatment at 1050° C.)

Molded bodies for sintering of the ceramic powder materials of Examples and Comparative Examples were first obtained by a similar method to that described in the section of "crystal phase of ceramic powder material after heat treatment at 900° C.".

Next, the molded body for sintering obtained was subjected to a heat treatment at 1050° C. for 25 hours to obtain a columnar sintered body.

The columnar sintered body obtained was ground using a mortar and powderized, and the X-ray diffraction spectrum of this powderized sintered body was obtained by a similar method to that described in the section of "crystal phase of ceramic powder material before heat treatment".

The content ratio ([content of tetragonal garnet-type compound]/[content of cubic garnet-type compound]) of the tetragonal garnet-type compound to the cubic garnet-type compound contained in the ceramic powder material after being subjected to a heat treatment at 1050° C. was determined by a similar method to that described in the section of "crystal phase of ceramic powder material before heat treatment".

Whether the crystal phase of the main phase was a cubic phase or a tetragonal phase was evaluated by similar criteria to those described in the section of "crystal phase of ceramic powder material before heat treatment". The results are presented in Table 1.

Figure 5:
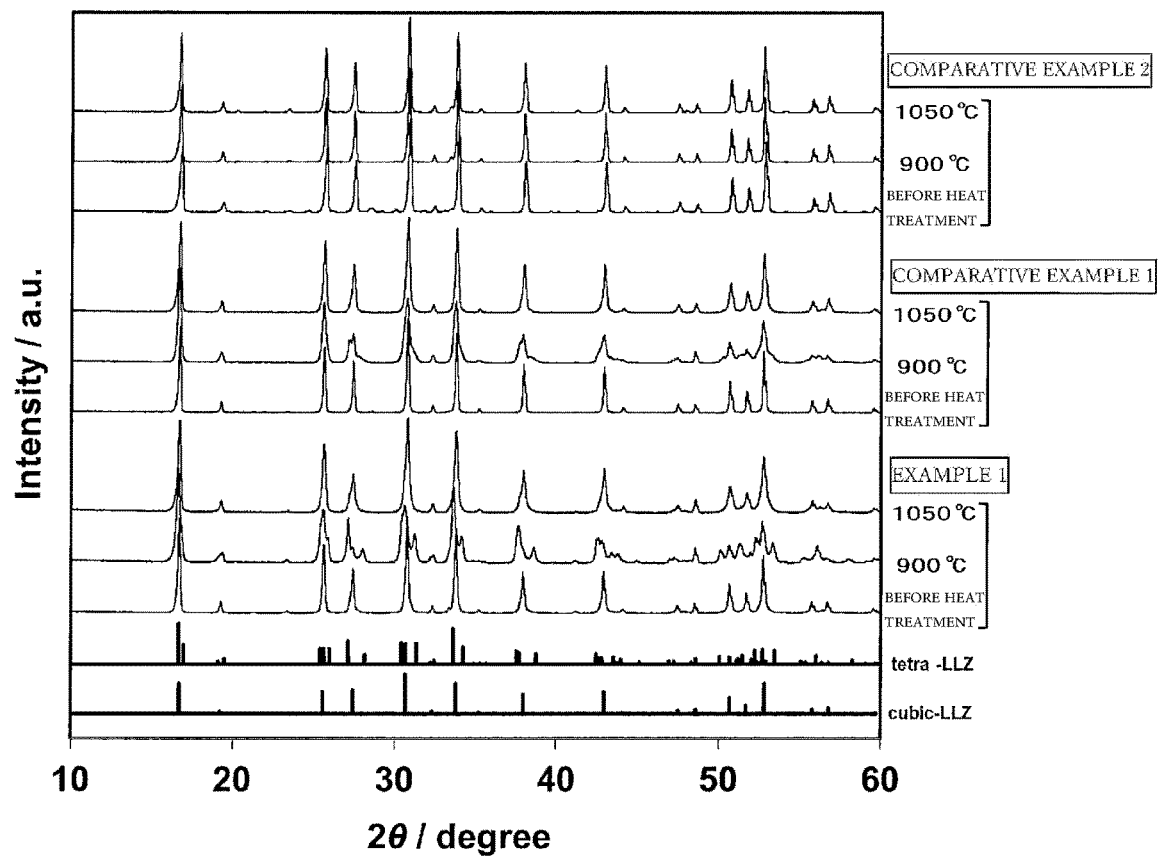
FIG. 5 is X-ray diffraction spectra of ceramic powder materials of Example 1, Comparative Example 1, and Comparative Example 2.
Figure 6:
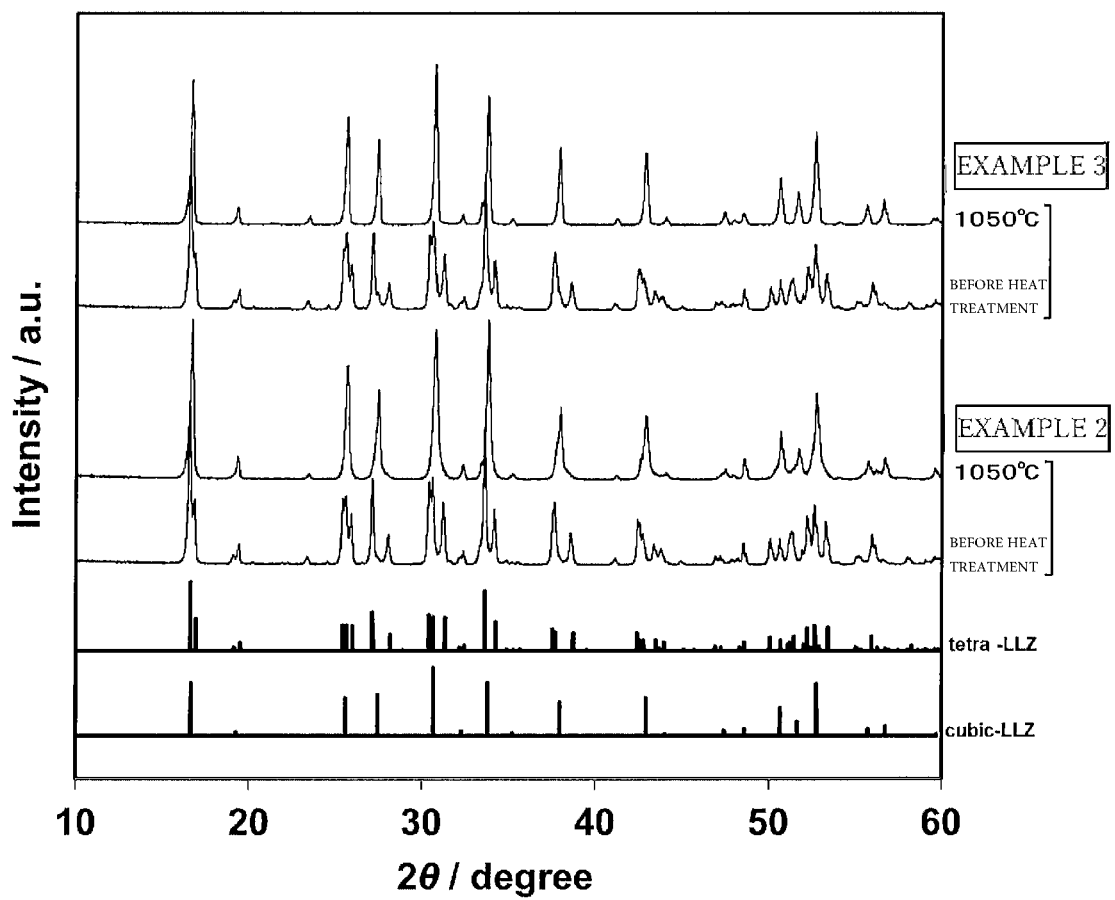
FIG. 6 is X-ray diffraction spectra of ceramic powder materials of Example 2 and Example 3.

FIG. 5 illustrates the X-ray diffraction spectra of the ceramic powder materials of Example 1, Comparative Example 1, and Comparative Example 2, and FIG. 6 illustrates the X-ray diffraction spectra of the ceramic powder materials of Example 2 and Example 3. FIG. 5 illustrates the X-ray diffraction spectra before a heat treatment, after a heat treatment at 900° C., and after a heat treatment at 1050° C., respectively. FIG. 6 illustrates the X-ray diffraction spectra before a heat treatment and after a heat treatment at 1050° C., respectively.

In Examples, it has been confirmed that the main phase of the crystal phase undergoes phase transition from a tetragonal phase to a cubic phase in the process of raising the temperature from 900° C. to 1050° C. It has also been confirmed that the main phase is the cubic phase even after the temperature is lowered to 25° C. after the main phase of the crystal phase has undergone phase transition from a tetragonal phase to a cubic phase. Specifically, in Example 1, it has been confirmed that the main phase is a cubic phase before a heat treatment, changes to a tetragonal phase by a heat treatment at 900° C., and further is a cubic phase after the temperature is raised to 1050° C. and lowered to 25° C. In Example 2 to Example 6, it has been confirmed that the main phase is a tetragonal phase before a heat treatment and is a cubic phase after the temperature is raised to 1050° C. and lowered to 25° C.

[Measurement of Density of Sintered Body]

Columnar sintered bodies of the ceramic powder materials of Examples and Comparative Examples were obtained by a similar method to that described in the section of "crystal phase of ceramic powder material after heat treatment at 1050° C.".

Thereafter, the density (g/cm$^3$) of the sintered body was calculated from the dimensions (diameter φ of circle, thickness d) and mass w of the columnar sintered body by the following equation. The results are presented in Table 1.

$$[\text{Density}(g/cm^3)]=w/\{(\varphi/2)^2 \times \pi \times d\}$$

Figure 7:
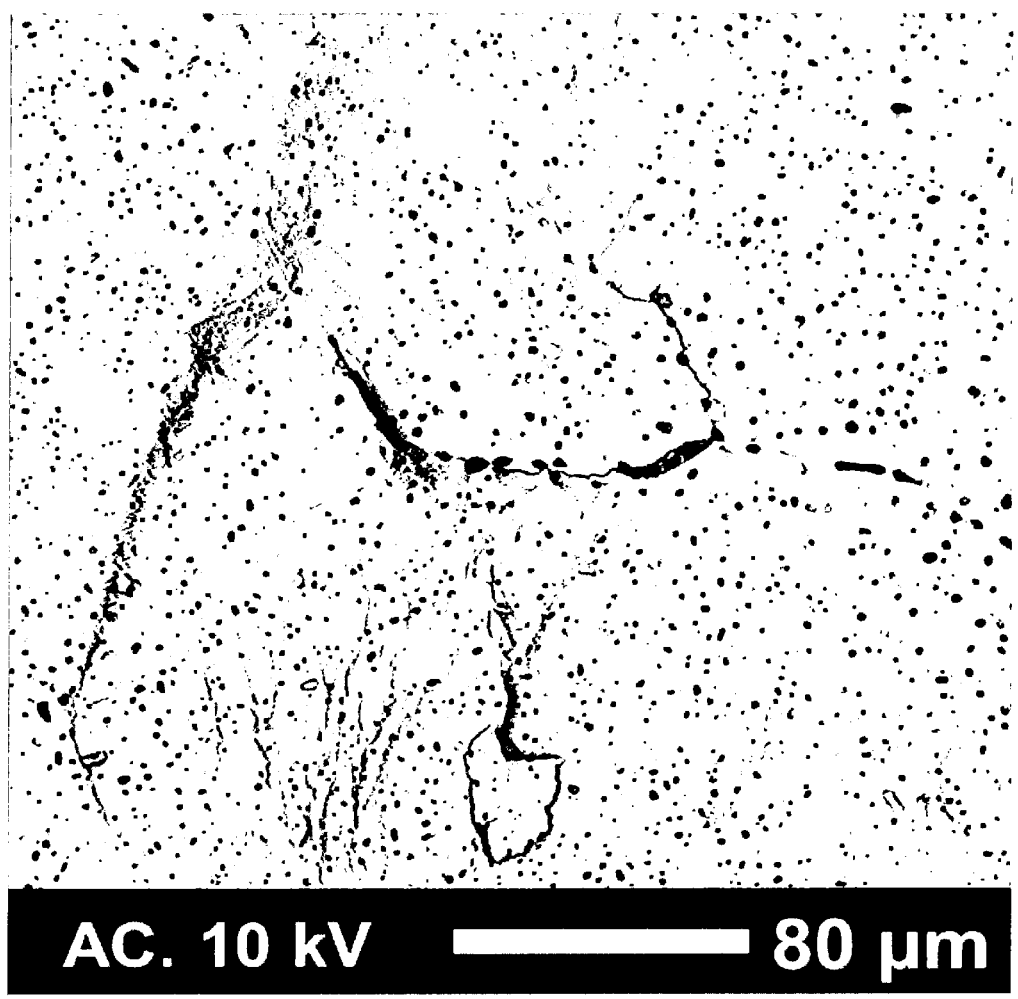
FIG. 7 is a SEM image of a sintered body obtained by subjecting a ceramic powder material of Example 3 to a heat treatment at 1050° C.
Figure 8:
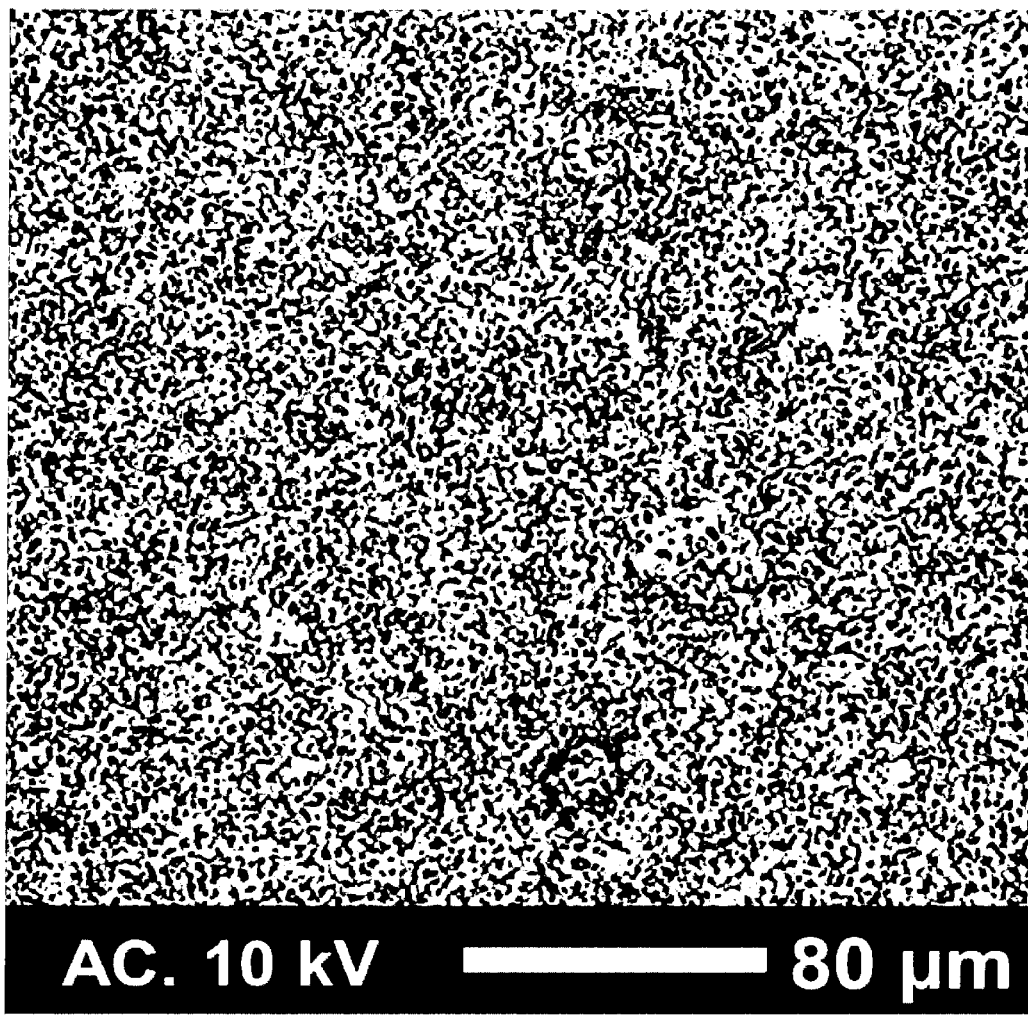
FIG. 8 is a SEM image of a sintered body obtained by subjecting a ceramic powder material of Comparative Example 2 to a heat treatment at 1050° C.

FIG. 7 illustrates a SEM image of a sintered body obtained by subjecting the ceramic powder material of Example 3 to a heat treatment at 1050° C. FIG. 8 illustrates a SEM image of a sintered body obtained by subjecting the ceramic powder material of Comparative Example 2 to a heat treatment at 1050° C. In the SEM images, the black part is a hollow.

As illustrated in FIG. 7, the sintered body according to Example 3 is a dense sintered body having few hollows and this is consistent with the result of density measurement of 4.6 g/cm$^3$ or more.

On the other hand, as illustrated in FIG. 8, the sintered body according to Comparative Example 2 has a large number of hollows, and the result of the density measurement is 3.59 g/cm$^3$, and this is consistent with the fact that the value is smaller than that in Examples.

[Measurement of Ionic Conductivity of Sintered Body]

Columnar sintered bodies of the ceramic powder materials of Examples and Comparative Examples were obtained by a similar method to that described in the section of "crystal phase of ceramic powder material after heat treatment at 1050° C.".

Conductive carbon paste was applied to both sides of the columnar sintered body obtained and dried to form an electrode. This was sandwiched between stainless steel plates connected to a platinum wire, fixed, held in a constant temperature bath in an air atmosphere, and subjected to the AC impedance measurement under the following conditions to obtain the ionic conductivity ($\sigma_T$) of the sintered body at the respective temperatures of 30° C. to 60° C. The ionic conductivity ($\sigma_T$(30° C.)) at a temperature of 30° C. at this time is presented in Table 1.

<AC Impedance Measurement Conditions>

Instrument name: Frequency Response Analyzer (Model 1255B) and Potentiogalvanostat (Model 1287) manufactured by Solartron Metrology Measurement frequency region: 1 Hz to 1 MHz Measurement temperature region: 30° C. to 60° C.

[Activation Energy (Ea) of Lithium-Ion Conduction]

The activation energy (Ea) of lithium-ion conduction was calculated from the temperature dependency of $\sigma_T$ calculated in the "measurement of ionic conductivity of sintered body". In other words, the ionic conductivities at 30° C., 40° C., 50° C., and 60° C. were plotted by taking the horizontal axis as the temperature and the vertical axis as the logarithm of ionic conductivity (log[ion conductivity]), and the activation energy (Ea) of lithium-ion conduction was calculated from the slope of a graph (Arrhenius plot) illustrating the temperature dependency of lithium-ion conductance by the Arrhenius equation: $\sigma = \sigma_0 \exp(-Ea/RT)$ ($\sigma$: lithium-ion conductance, $\sigma_0$: pre-exponential factor, R: gas constant, T: absolute temperature). The results are presented in Table 1.

It has been confirmed that the values of $\sigma_T$ and Ea of the sintered bodies obtained from the ceramic powder materials of Examples are similar to the characteristics of sintered bodies of LLZ-based garnet-type compounds reported so far and the sintered bodies obtained from the ceramic powder materials of Examples exhibit high lithium-ion conductivity.

a main phase of a crystal phase undergoes phase transition from a tetragonal phase to a cubic phase in process of raising a temperature from 25° C. to 1050° C. and the main phase is the cubic phase even after the temperature is lowered to 25° C., wherein the ceramic powder material includes aluminum such that the ceramic powder material satisfies the following features:

a number of La atoms with respect to two Zr atoms is more than 3 and 4 or less, and

[X−(Y−3)] is 0.14 or more and 0.25 or less, where X is a number of Al atoms with respect to two Zr atoms and Y is a number of La atoms with respect to two Zr atoms.

2. The ceramic powder material according to claim 1, wherein the LLZ-based garnet-type compound contains one or more elements selected from the group consisting of gallium, yttrium, cerium, calcium, barium, strontium, niobium, and tantalum.

3. The ceramic powder material according to claim 1, comprising a La compound represented by $Li_xLa_{1+2x}Al_{1-x}O_{3+2x}$ (where x is 0 or 0.5).

4. The ceramic powder material according to claim 1, wherein the ceramic powder material is subjected to a heat treatment at 1050° C. to obtain a sintered body having a density of 4.6 g/cm$^3$ or more and 5.2 g/cm$^3$ or less.

5. The ceramic powder material according to claim 1, wherein the ceramic powder material is subjected to a heat treatment at 1050° C. to obtain a sintered body having a lithium-ion conductivity of $1 \times 10^{-5}$ S/cm or more and $1 \times 10^{-3}$ S/cm or less at a measurement temperature of 30° C.

6. A method for producing a ceramic powder material, which is a method for producing the ceramic powder material according to claim 1 and comprises:

a first step of mixing a solution of a carbonic acid species, a compound containing La as a constituent element, and a compound containing Al as a constituent element to obtain a precipitate;

TABLE 1

| Evaluation item | | Example 1 | Example 2 | Example 3 | Example 4 | Example 5 | Example 6 | Comparative Example 1 | Comparative Example 2 |
|---|---|---|---|---|---|---|---|---|---|
| Composition | Number of La atoms with respect to two Zr atoms | 3.04 | 3.06 | 3.10 | 3.15 | 3.54 | 3.04 | 2.98 | 2.97 |
| | Number of Al atoms with respect to two Zr atoms | 0.26 | 0.28 | 0.32 | 0.37 | 0.7 | 0.23 | 0.24 | 0.36 |
| | Number of Li atoms with respect to two Zr atoms | 6.64 | 6.54 | 6.44 | 7.14 | 6.70 | 6.64 | 6.54 | 6.42 |
| | [X−(Y−3)] | 0.22 | 0.22 | 0.22 | 0.22 | 0.16 | 0.19 | 0.26 | 0.39 |
| | $I_t/I_c$ before heat treatment | 0.02 | 0.19 | 0.17 | 0.11 | 0.17 | 0.03 | 0.02 | 0.02 |
| | Main phase before heat treatment | Cubic phase | Tetragonal phase | Tetragonal phase | Tetragonal phase | Tetragonal phase | Cubic phase | Cubic phase | Cubic phase |
| | $I_t/I_c$ after heat treatment at 900° C. | 0.15 | 0.19 | 0.17 | 0.11 | 0.17 | 0.10 | 0.08 | 0.02 |
| | Main phase after heat treatment at 900° C. | Tetragonal phase | Tetragonal phase | Tetragonal phase | Tetragonal phase | Tetragonal phase | Tetragonal phase | Cubic phase | Cubic phase |
| | $I_t/I_c$ after heat treatment at 1050° C. | 0.04 | 0.05 | 0.04 | 0.08 | 0.07 | 0.04 | 0.05 | 0.02 |
| | Main phase after heat treatment at 1050° C. | Cubic phase | Cubic phase | Cubic phase | Cubic phase | Cubic phase | Cubic phase | Cubic phase | Cubic phase |
| | Presence or absence of phase transition from tetragonal phase to cubic phase | Presence | Presence | Presence | Presence | Presence | Presence | Absence | Absence |
| Physical | Density/g · cm$^{-3}$ | 4.89 | 4.83 | 4.92 | 4.89 | 4.86 | 4.73 | 4.54 | 3.59 |
| | $s_T$(30° C.)/Scm$^{-1}$ | $1.4 \times 10^{-4}$ | $1.3 \times 10^{-4}$ | $2.0 \times 10^{-4}$ | $7.6 \times 10^{-5}$ | $3.5 \times 10^{-5}$ | $1.7 \times 10^{-4}$ | $1.9 \times 10^{-4}$ | N.D. |
| | Ea/kJmol$^{-1}$ | 20.71 | 24.1 | 21.37 | 30.87 | 26.76 | 28.55 | 26.4 | N.D. |

The invention claimed is:

1. A ceramic powder material comprising an LLZ-based garnet-type compound represented by $Li_{7-3x}Al_xLa_3Zr_2O_{12}$ (where x satisfies 0≤x≤0.3), wherein a second step of preparing a mixture of the precipitate, a solution containing a zirconium carbonate complex, and a compound containing Li as a constituent element; and a third step of calcining the mixture at a temperature of 500° C. or more and 900° C. or less to obtain a calcined product.

7. The method for producing a ceramic powder material according to claim 6, wherein in a ceramic powder material obtained by the method, a number of La atoms with respect to two Zr atoms is more than 3 and 4 or less, and

[X−(Y−3)] is 0.14 or more and 0.25 or less, where X is a number of Al atoms with respect to two Zr atoms and Y is a number of La atoms with respect to two Zr atoms.

8. A battery comprising a sintered body obtained by sintering the ceramic powder material according to claim 1.

9. The ceramic powder material according to claim 1, wherein, the number of La atoms with respect to two Zr atoms is 3.03 or more.

* * * * *